United States Patent [19]
Graefe et al.

[11] Patent Number: 5,822,747
[45] Date of Patent: Oct. 13, 1998

[54] SYSTEM AND METHOD FOR OPTIMIZING DATABASE QUERIES

[75] Inventors: Goetz Graefe, Bellevue, Wash.; Pedro Celis, Austin, Tex.; Jay Vaishnav, Cupertino; Hansjorg Zeller, Los Altos, both of Calif.

[73] Assignee: Tandem Computers, Inc., Cupertino, Calif.

[21] Appl. No.: 702,106

[22] Filed: Aug. 23, 1996

[51] Int. Cl.⁶ .................................................. G06F 17/30
[52] U.S. Cl. ...................................... 707/2; 707/4
[58] Field of Search .............................. 707/2, 3, 4, 203, 707/6

[56] References Cited

U.S. PATENT DOCUMENTS

| | | | |
|---|---|---|---|
| 5,091,852 | 2/1992 | Tsuchida et al. | 707/2 |
| 5,325,525 | 6/1994 | Shan et al. | 395/674 |
| 5,335,345 | 8/1994 | Frieder et al. | 707/5 |
| 5,590,324 | 12/1996 | Leung et al. | 707/5 |
| 5,598,559 | 1/1997 | Chaudhuri | 707/2 |
| 5,659,725 | 8/1997 | Levy et al. | 707/3 |

FOREIGN PATENT DOCUMENTS

0573252A2  12/1993  European Pat. Off. .

OTHER PUBLICATIONS

Goetz Graefe and William J. McKenna, The Volcano Optimizer Generatolr: Extensibility and Efficient Search, 1993 IEEE pp. 209–218.

Hyeokman Kim, Sukho Lee, Tree Query Optimization in Distributed Object–Oriented Databases, Apr. 1994.

*Primary Examiner*—Thomas G. Black
*Assistant Examiner*—Srirama Channavajjala
*Attorney, Agent, or Firm*—Gary S. Williams, Esq.; Flehr Hohbach Test, Albritton & Herbert LLP

[57] ABSTRACT

A system and method for optimizing a database query is herein disclosed. The system consists of a search engine and a database implementor that determines an optimal plan for executing a SQL query. The SQL query is represented as a query tree consisting of a number of nested expressions. The search engine generates a number of plans from which an optimal plan is selected. Plans are generated through the application of a set of rules consisting of implementation and transformation rules. Implementation rules are used to obtain plans. Transformation rules are used to determine equivalent expressions. A plan for the query tree entails finding plans for each expression within the tree where each plan is generated in accordance with a prescribed set of rules. The database implementor selects the set of rules such that more promising plans are generated rather than generating all possible plans. In a preferred embodiment of the invention, multiple passes are made by the search engine in order to determine the optimal plan. In a first pass, implementation rules are used in order to generate a first plan having a cost that is used as a threshold when generating for additional plans. In each subsequent pass, a set of implementation and transformation rules is used to generate one or more plans whose cost does not exceed the threshold. An optimal plan is selected from the generated plans as the one having the lowest cost.

28 Claims, 24 Drawing Sheets

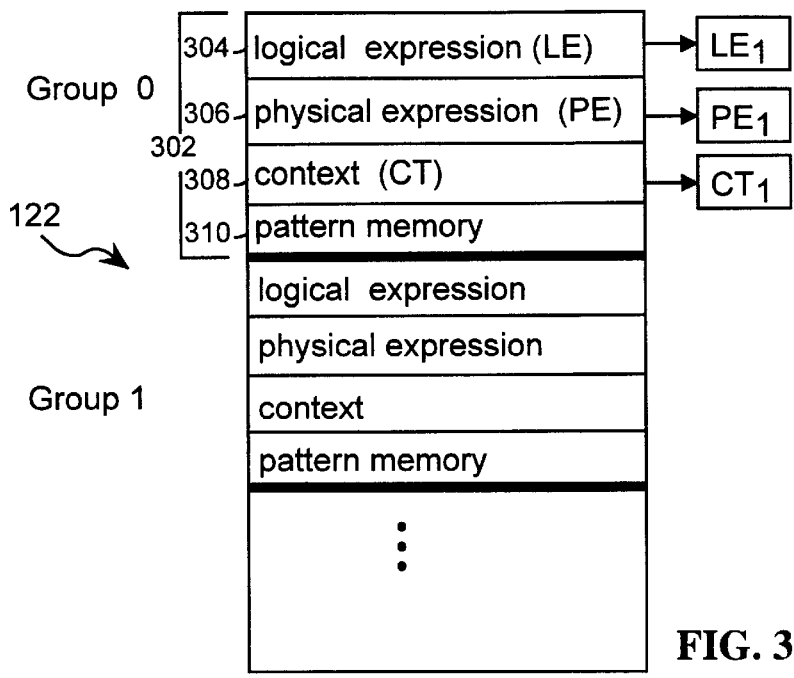
FIG. 3A
MEMO
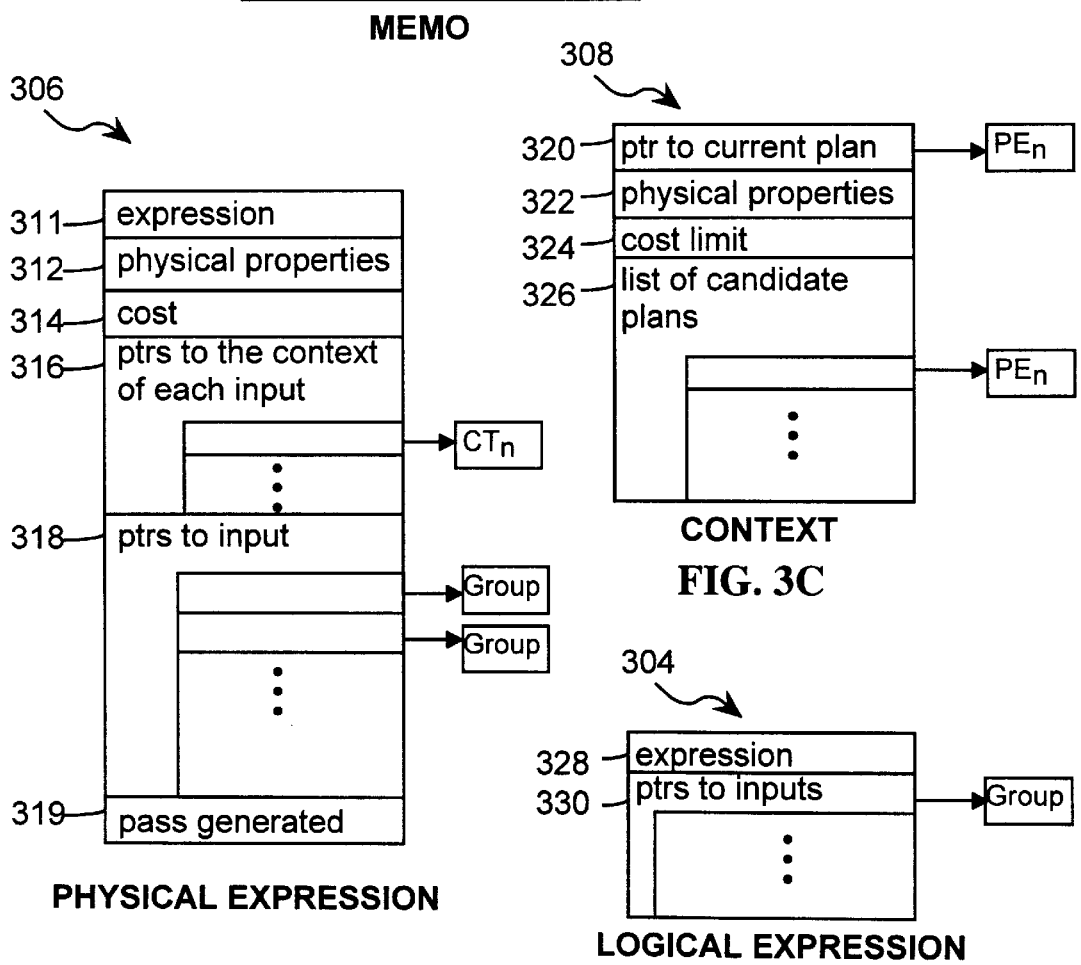
PHYSICAL EXPRESSION
FIG. 3B
CONTEXT
FIG. 3C
LOGICAL EXPRESSION
FIG. 3D

| Rule | Promise Function |
|---|---|
| Rule 1 | 2.5 |
| Rule 2 | 1.6 |
| Rule 8 | 0.7 |
| Rule 4 | 0.3 |
| Rule 17 | 0.25 |
1200, 1202, 1204, 1206 — cutoff point
FIG. 12
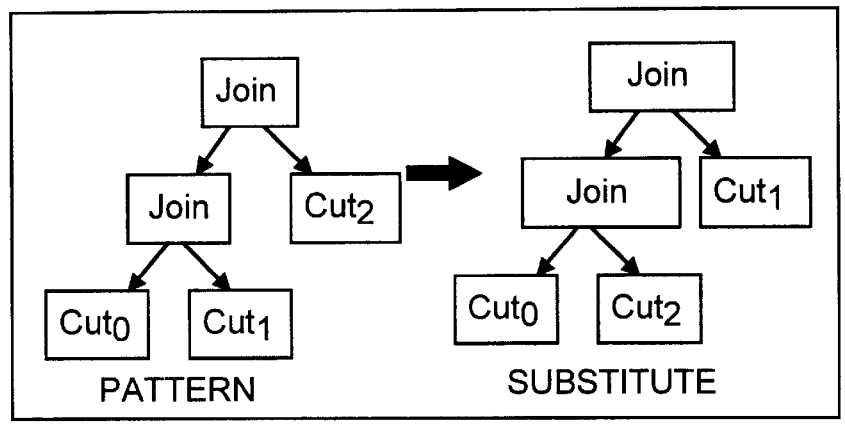
FIG. 13A
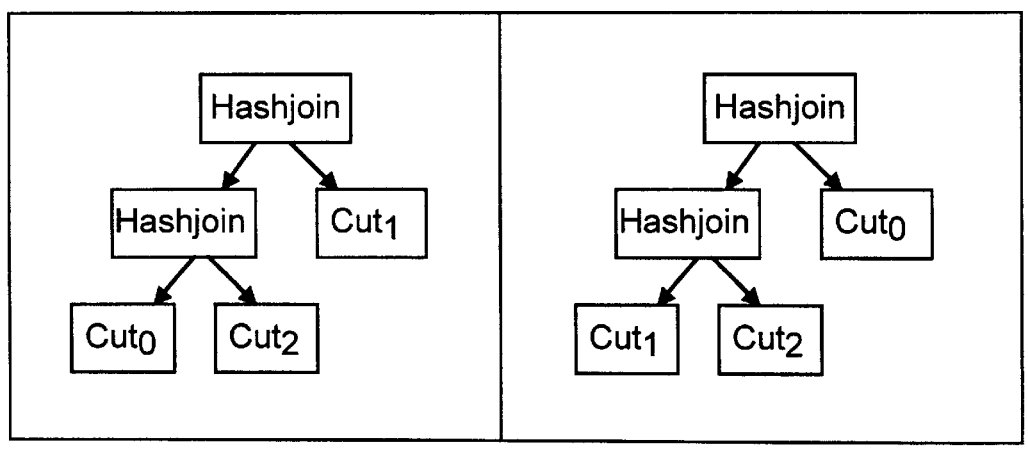
FIG. 13B

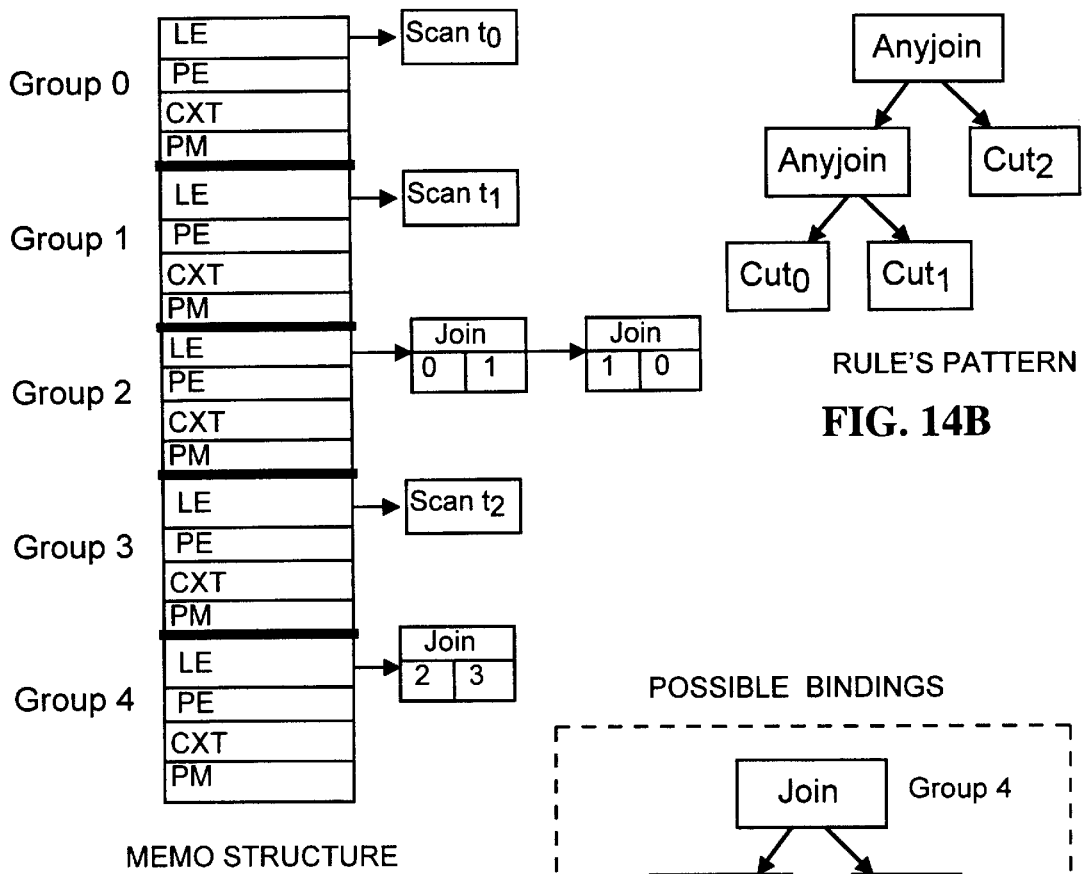
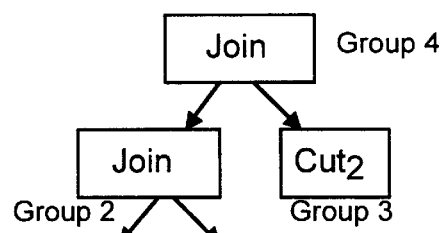
MEMO STRUCTURE
FIG. 14A
RULE'S PATTERN
FIG. 14B
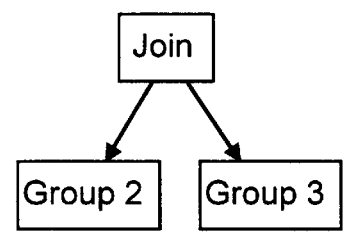
RULE'S PATTERN TO BE APPLIED TO THIS EXPRESSION (GROUP 4)
FIG. 14C
POSSIBLE BINDINGS
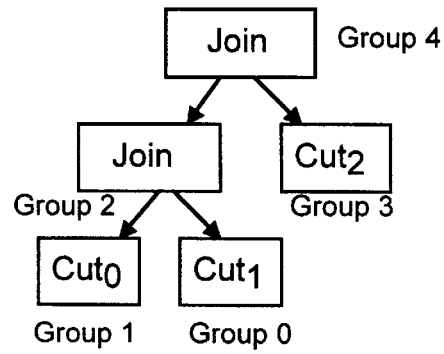
FIG. 14D

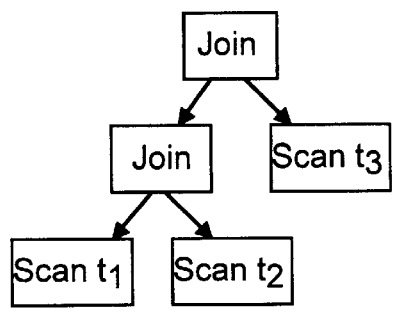
FIG. 15A
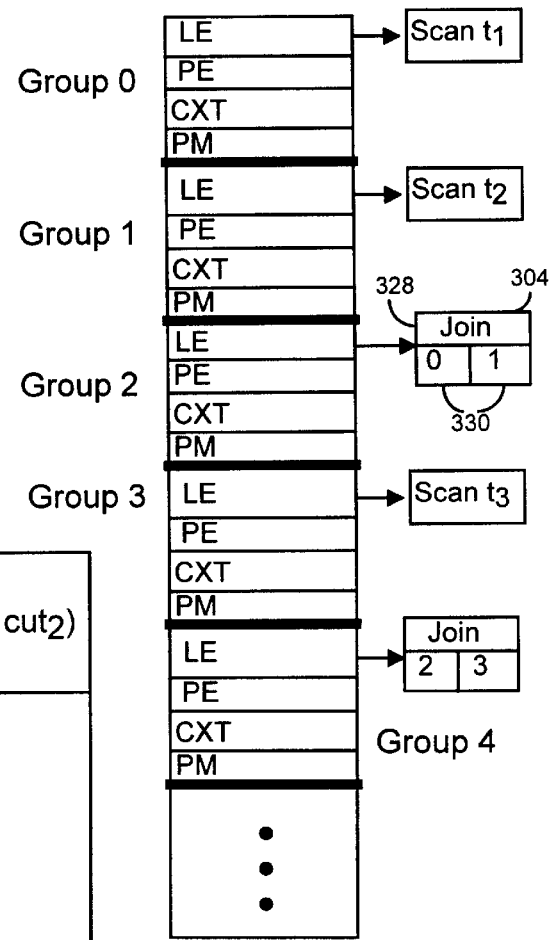
MEMO STRUCTURE
FIG. 15C
(1) Scan (x) -> Filescan (x)
(2) Join($cut_1$, $cut_2$) -> Hashjoin($cut_1$, $cut_2$)
RULE SET 1
(1) Join (Join($cut_1$, $cut_2$), $cut_3$) ->
Join(Join($cut_1$, $cut_3$), $cut_2$)
(2) Join($cut_1$, $cut_2$) -> Mergejoin
($cut_1$, $cut_2$)
(3) Join($cut_1$, $cut_2$) -> Join ($cut_2$, $cut_1$)
RULE SET 2
FIG. 15B
---
Optimize_Group (4, req'd phys props, guidance)
TASK STACK
FIG. 15D
---
Optimize_Expression (Join(2,3), req'd phys props, guidance)
TASK STACK
FIG. 15E

Top | Apply_Rule (Hashjoin, Join(2,3), req phys props, OE, guidance)
TASK STACK
FIG. 15F
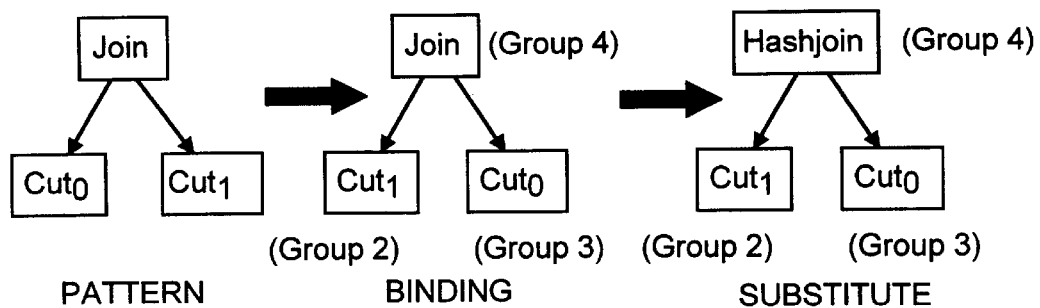
FIG. 15G
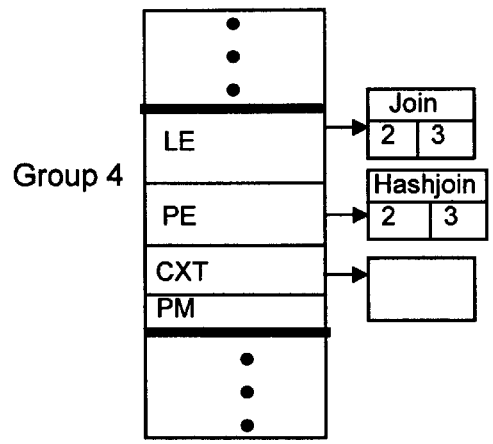
FIG. 15H
Top | Optimize_Inputs(Hashjoin(2,3), req phys props, guidance, input 1)
TASK STACK
FIG. 15I

Top  | Optimize_Group(2, req phys props, OptInputGuidance())
Bottom | Optimize_Inputs (Hashjoin(2,3), req phys props, guidance, input 2)

TASK STACK

FIG. 15J

Top | Optimize_Expression(Join(0,1), req phys props, guidance)
Bottom | Optimize_Inputs (Hashjoin(2,3), req phys props, guidance, input 2)

TASK STACK

FIG. 15K

Top | Apply_Rule (Hashjoin, Join(0,1), req phys props, OE, guidance)
Bottom | Optimize_Inputs (Hashjoin(2,3), req phys props, guidance, input 2)

TASK STACK

| Top | Optimize_Inputs(Hashjoin(0,1), req phys props, guidance, input 1) |
|---|---|
| Bottom | Optimize_Inputs (Hashjoin(2,3), req phys props, guidance, input 2) |

TASK STACK

| Top | Optimize_Group(0, req phys props, optInputGuidance()) |
|---|---|
|  | Optimize_Inputs (Hashjoin(0,1), req'd phys props, guidance, input 2) |
| Bottom | Optimize_Inputs (Hashjoin(2,3), req phys props, guidance, input 2) |

TASK STACK

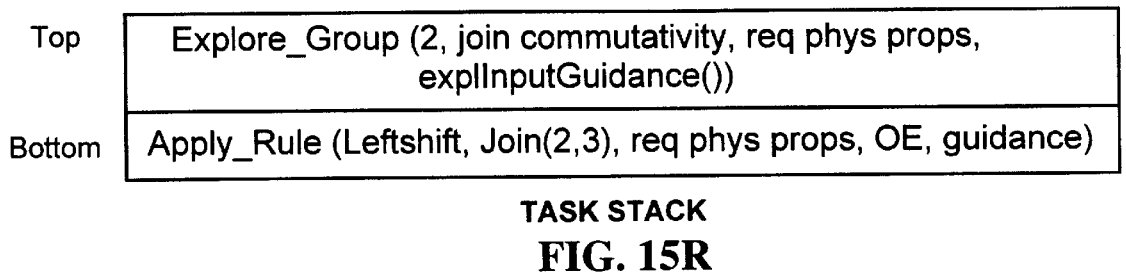
TASK STACK
FIG. 15R
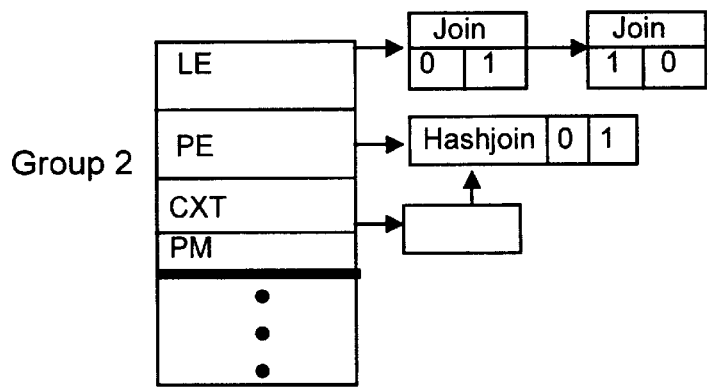
FIG. 15S
Apply_Rule (Leftshift, Join(2,3), req phys props, OE, guidance)
TASK STACK
FIG. 15T

FINAL PLANS

SYSTEM AND METHOD FOR OPTIMIZING DATABASE QUERIES

The present invention relates generally to database query processing and specifically to rule-based database query optimizers.

BACKGROUND OF THE INVENTION

A central issue in the design of database systems is the query processing strategy that is employed. Considerable focus has been placed in this area since a poor strategy can adversely effect the performance of the database system. Since the transfer of data that usually resides on secondary storage is slower than from main memory, it is imperative that the number of accesses to secondary storage be minimized. In SQL and similar query processing languages, a query can be expressed in a variety of different representations. Typically, a user writes a query without considering the most efficient manner for realizing the query. This task becomes the responsibility of a query optimizer.

The objective of the query optimizer is to find an execution strategy that causes the result of the query to be produced in the most efficient ("optimal") manner. Optimality is used to denote the best strategy that satisfies a prescribed criteria. Often this criteria is the minimization of a defined metric, such as computational cost. Query optimization is a search process that entails producing a solution space of semantically equivalent expressions that represent the query. The semantically equivalent expressions are generated through the application of rules. The optimizer searches through the solution space finding the optimal solution that best satisfies the defined metric.

In one prior art query optimizer, solutions or plans are generated through the application of transformation and implementation rules. A transformation rule produces equivalent expressions and an implementation rule generates solutions. The prior art query optimizer employs a two-phase strategy. In a first or exploration phase, equivalent expressions for the input query are produced. The actual optimization process begins in a second or optimization phase by generating several solutions from which an optimal solution is selected.

A disadvantage of this scheme is that a large number of equivalent expressions are produced that will not produce viable solutions. The consideration of these expressions needlessly burdens the optimizer since it increases the intensity and complexity of the search which ultimately increases the execution time for the query. Accordingly, there is a need to limit the solution space to those expressions that will produce more promising solutions.

It is an object of the present invention to provide a computationally efficient technique for processing database queries.

It is another object of the present invention to provide a method and system for providing a solution space for a query optimizer that contains more promising solutions.

It is another object of the present invention to provide a method and system that utilizes heuristics to produce a solution space including more promising solutions.

It is another object of the present invention to provide a method and system that tracks all solutions that are considered by a query optimizer.

It is a further object of the present invention to provide a method and system that determines the optimal solution for a database query by employing several optimization passes.

Other general and specific objects of this invention will be apparent and evident from the accompanying drawings and the following description.

SUMMARY OF THE INVENTION

The present invention pertains to a method and system for optimizing SQL database queries. The query optimizer contains a search engine and a database implementor (DBI). The search engine generates a solution space from which an optimal solution or plan is selected. The solution space is defined by a set of rules and search heuristics provided by the DBI. The rules are used to generate solutions and the search heuristics guide the search engine to produce more promising solutions.

The database query is represented as a query tree containing one or more expressions. An expression contains an operator having zero or more inputs that are expressions. The query optimizer utilizes two types of expressions: logical expressions each of which contain a logical operator; and physical expressions each of which contain a physical operator specifying a particular implementation for the logical operator. An implementation rule transforms a logical expression into a equivalent physical expression and a transformation rule produces an equivalent logical expression. The database query is initially composed of logical expressions. Through the application of one or more implementation and transformation rules, the logical expressions in the database query are transformed into physical expressions resulting in a solution.

The search engine utilizes a search procedure that generates a solution by partitioning the database query into one or more subproblems where each subproblem can contain one or more expressions. Some of the subproblems form a subtree including other subproblems as inputs. A solution to each subproblem is generated in accordance with an order that generates a solution for each input subproblem before a solution for its associated parent subproblem is generated. The solution for the database query is then obtained as the combination of the solutions for each of the subproblems.

Solutions are generated through the application of implementation and transformation rules. When a solution for a subproblem is desired, equivalent expressions are then generated for the subproblem. The choice of rules is guided by search heuristics provided by the DBI and are tailored to produce those equivalent expressions that will yield more promising solutions rather than all possibilities.

The search procedure utilizes a branch and bound technique for generating solutions for each subproblem. An initial solution is obtained for each subproblem that has an associated cost which is used as an upper bound for considering other candidate solutions. Additional solutions whose associated costs exceed the upper bound are eliminated from consideration. The solution having the lowest cost is selected as the optimal solution.

A search data structure is used to store the expressions that are generated during the search process including those that are eliminated from consideration. During the search process, an expression can be generated that already exists in the search data structure. A check is made before an expression is stored in the search data structure in order to avoid storing duplicate expressions.

In a preferred embodiment, the query optimizer performs multiple optimization passes. A first pass using only implementation rules is made to generate a first solution having a cost that is used as a threshold. In one or more subsequent passes, a set of both implementation and transformation rules is applied to generate one or more additional solutions each of which has a cost that does not exceed the threshold.

The search engine utilizes a series of tasks to implement the search procedure. Each task performs a number of predefined operations and schedules one or more additional tasks to continue the search process if needed. Each task terminates once having completed its assigned operations. A task stack is used to store tasks awaiting execution which is preferably operated in a last-in-first-out manner. A task scheduler is used to pop tasks off the top of the stack and to schedule tasks for execution.

BRIEF DESCRIPTION OF THE DRAWINGS

Additional objects and features of the invention will be more readily apparent from the following detailed description and appended claims when taken in conjunction with the drawings, in which:

FIGS. 3A–3D are block diagrams of the Memo search data structure in a preferred embodiment of the present invention.

FIG. 12 depicts the manner in which a suitable set of rules is selected in a preferred embodiment of the present invention.

FIGS. 13A–13B illustrate the exploration of a rule in a preferred embodiment of the present invention.

FIGS. 14A–14D illustrate an example of generating all possible bindings for a particular rule's application.

DESCRIPTION OF THE PREFERRED EMBODIMENTS

System Architecture

Figure 1:
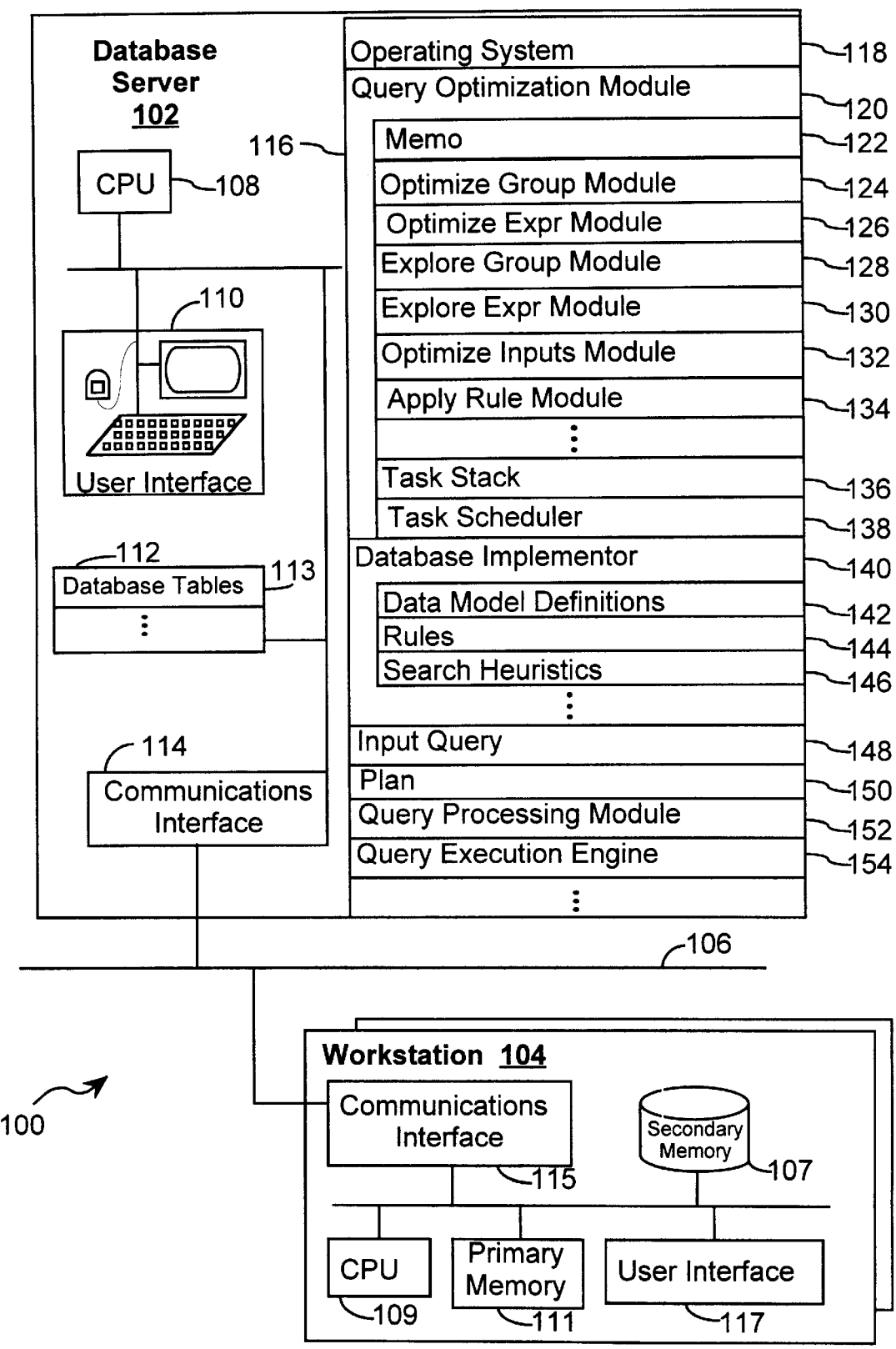
FIG. 1 is a block diagram of a computer system incorporating a preferred embodiment of the present invention.

Referring to FIG. 1, there is shown a computer system 100 for storing and providing user access to data in stored databases. The system 100 is a distributed computer system having multiple computers 102, 104 interconnected by local area and wide area network communication media 106. The system 100 generally includes at least one database server 102 and many user workstation computers or terminals 104.

In the preferred embodiment, the database server 102 can be a SQL database engine that manages the control and execution of SQL commands. The workstation computers 104 pass SQL queries to the SQL database engine 102. A user associated with a workstation computer 104 can transmit a SQL query to retrieve and/or modify a set of database tables 113 that are stored in the database server 102. The SQL database engine 102 generates an optimized plan for executing the SQL query and then executes the plan.

The database server 102 includes a central processing unit (CPU) 108, primary memory 116, a secondary memory 112, a communications interface 114 for communicating with user workstations 104 as well as other system resources not relevant here. The secondary memory 112 is typically magnetic disc storage that stores database tables 113. It should be noted that when very large databases are stored in a system, the database tables will be partitioned, and different partitions of the database tables will often be stored in different database servers. However, from the viewpoint of user workstation computers 104, the database server 102 appears to be a single entity. The partitioning of databases and the use of multiple database servers is well known to those skilled in the art.

The primary memory of the database server 102 can contain the following:
an operating system 118;
a query optimization module or query optimizer 120 that contains data structures and modules for generating a plan that optimizes the input query, the query optimizer can contain the following:
   a search data structure 122, denoted as Memo, that stores groups of semantically equivalent expressions;
   an Optimize Group task module 124 that obtains a plan for a particular group;
   an Optimize Expression task module 126 that determines a set of rules for use in generating one or more plans for a particular logical expression;
   an Explore Group task module 128 that applies a particular transformation pattern to a particular group;
   an Explore Expression task module 130 that determines a set of transformation rules for generating a series of logical expressions;
   an Optimize Inputs task module 132 that obtains plans for converting each input expression to a physical expression;
   an Apply Rule task module 134 that performs the application of one or more rules to an expression;
   a task stack 136 that stores one or more tasks generated by the query optimizer that are pending execution;
   a task scheduler 138 that manages the execution of the tasks on the task stack 136;
a database implementor (DBI) 140 which is a user-defined set of procedures that define a data model and which can containing the following:
   data model definitions 142;
   rules 144 that specify the possible mappings to generate additional semantically equivalent expressions; and
   search heuristics 146 that control the search strategy;
an input query 148 to be optimized;

a plan 150 that is best suited for implementing the input query;

a query processing module 152 that processes the input query and produces a best plan for implementing the input query; and a query execution engine 154 that implements the optimal plan.

User workstations 104 typically include a central processing unit (CPU) 109, primary memory 111, a communications interface 115 for communicating with the database server 102 and other system resources, secondary memory 107, and a user interface 117. The user interface 117 typically includes a keyboard and display device, and may include additional resources such as a pointing device and printer. Secondary memory 107 can be used for storing computer programs, such as communications software used to access the database server 102. Some end user workstations 104 may be "dumb" terminals that do not include any secondary memory 107, and thus execute only software downloaded into primary memory 111 from a server computer, such as the database server 102 or a file server (not shown).

Glossary

To assist the reader, the following glossary of terms used in this document is provided.

Relational Expression: A relational expression is one that produces a table as its output, such as a join or scan. Relational expressions differ from value expressions that contain arithmetic operators and produce a value as an output. A relational expression can be a physical expression or a logical expression or both.

Logical Expression: A logical expression contains a logical operator of a certain arity (having a required number of inputs) and whose inputs are logical expressions. The arity of the logical operator is $\geq 0$. The inputs are also referred to as children or input expressions. FIG. 15A illustrates the logical expression Join (Join (scan $t_1$, scan $t_2$), scan $t_3$).

Figures 15N, 15O:
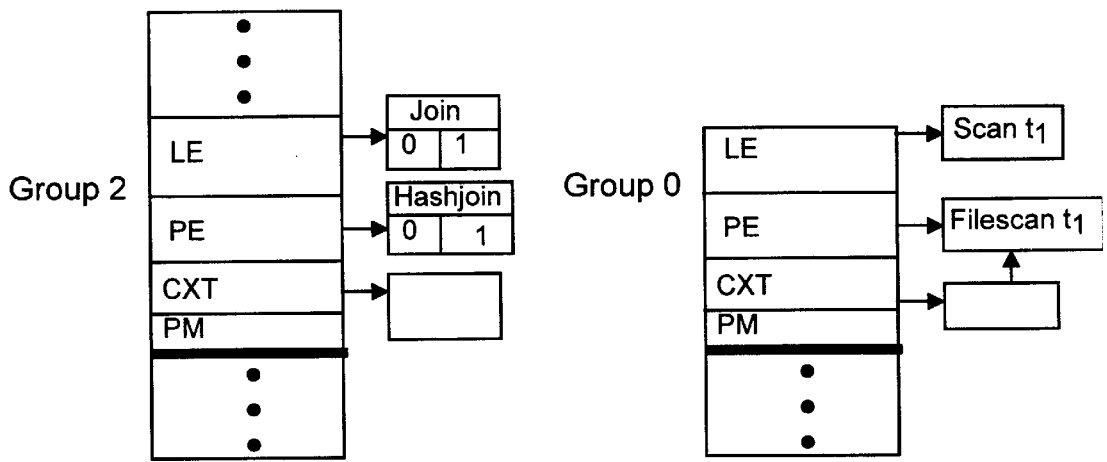
FIGS. 15A–15W illustrate an example of the processing by the query optimizer in a preferred embodiment of the present invention.

Physical Expression: A physical expression consists of a physical operator of a certain arity and whose inputs are physical expressions. Similarly, the arity of the physical operator is $\geq 0$. The inputs are also referred to as children or input expressions. FIG. 15W illustrates the physical expression Hashjoin (Hashjoin (Filescan $t_1$, Filescan $t_2$), Filescan $t_3$) which implements the logical expression Join (Join (scan $t_1$, scan $t_2$), scan $t_3$).

Logical Operator: A logical operator represents an implementation-independent operation (e.g., join or scan).

Physical Operator: A physical operator specifies a particular implementation method or procedure (e.g., hashjoin, mergejoin, etc.).

Expression tree: An expression tree corresponds to a relational expression having one or more logical or physical expressions. The expression tree consists of one or more nodes, each node is classified as a logical expression or a physical expression. Each node can contain zero or more inputs, each input being a relational expression. The expression tree consists of one or more levels, each level containing nodes that are inputs to a node of a preceding level. The root node represents a relational expression having the top-most operator and positioned in the first level. FIG. 15A illustrates an expression tree representing the logical expression Join (Join (scan $t_1$, scan $t_2$), scan $t_3$.

Plan: A plan is an expression tree that consists solely of physical expressions. FIG. 15W illustrates two plans: Hashjoin (Hashjoin (Filescan $t_1$, Filescan $t_2$), Filescan $t_3$) and MergeJoin(Mergejoin(Filescan $t_1$, Filescan $t_3$), Filescan $t_2$). The term plan and solution are used in this document interchangeably.

Query tree: A query tree is an expression tree that corresponds to the input query that is to be optimized. The query tree contains one or more nested logical expressions. FIG. 15A illustrates a query tree for the input query Join (Join (scan $t_1$, scan $t_2$, scan $t_3$).

Optimization rule: An optimization rule defines how the optimizer is to transform the input query into other semantically equivalent forms. In this application, there are two types of optimization rules: transformation rules and implementation rules. A transformation rule produces equivalent logical expressions and an implementation rule produces equivalent physical expressions.

Transformation rule: A transformation rule transforms a logical expression into a semantically equivalent logical expression (e.g., join associativity and commutativity).

Implementation rule: An implementation rule transforms a logical expression into a semantically equivalent physical expression by substituting one or more logical operators in the logical expression with physical operators (e.g., join may be implemented by mergejoin). The repeated application of implementation rules results in a plan that consists only of physical expressions.

Pattern and Substitute: An optimization rule consists of a pattern and a substitute, both of which are expression trees. The pattern is the before expression that is matched with the expression that is being optimized. The substitute represents the semantically equivalent expression that is generated by applying the rule. A rule's pattern matches an expression when the expression contains the same operators in the same position as the rule's pattern.

Cut operator: A cut operator is an input to a rule's pattern that can be matched to any operator.

Tree operator: A tree operator is an input to a rule's pattern that is matched to an entire expression tree.

Memo: A memo is a data structure used by the optimizer for representing elements of the search space. The Memo is organized into equivalence classes denoted as groups. Each group consists of one or more logical and physical expressions that are semantically equivalent to one another. Expressions are semantically equivalent if they produce the identical output. Initially each logical expression of the input query tree is represented as a separate group in Memo. As the optimizer applies rules to the expressions in the groups, additional equivalent expressions and groups are added.

Physical properties: A physical property specifies the manner for representing the output of an expression. Typically, the physical property is used to indicate a sort order (e.g., sorted by (a,b)), a compression status, or used to indicate partitioning for parallel and/or distributed systems.

The Query Processing System

Figure 2:
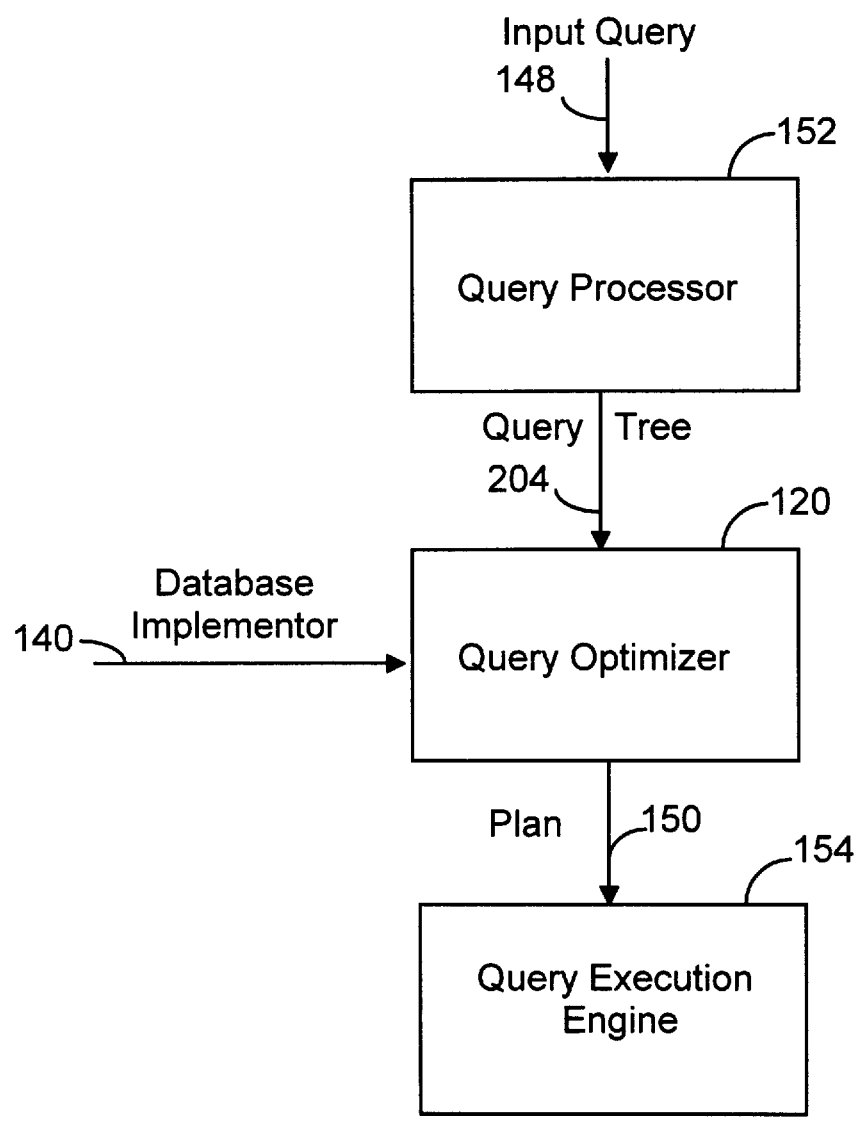
FIG. 2 is a block diagram of the processing modules that are used to execute a database query in a preferred embodiment of the present invention.

FIG. 2 illustrates the execution path of a database query in the preferred embodiment of the present invention. Initially, a user transmits to the database server 102 an input query 148 instructing the database server 102 to perform certain operations. The input query 148 is typically written in a query processing language such as SQL (Structured Query Language). The input query 148 is processed by a query processor 152 that includes a parser (not shown) which converts the input query 148 into an internal representation referred to as a query tree 204. The query tree 204 represents an expression to be optimized along with any required physical properties. The query processing system 152 utilizes a query optimizer 120 to generate one or more alternate execution plans. Associated with each plan is a cost for executing the plan. The query optimizer 120 chooses the plan 150 having minimal cost which is used by the query execution engine 154 to execute the input query 148.

The query optimizer of the present invention is composed of a search engine and a database implementor (DBI) 140. The search engine executes a series of tasks that generate one or more plans to implement the input query 148. The DBI 140 provides the data model definitions 142, rules 144, and search heuristics 146 that guide the manner in which the tasks generate plans. The DBI 140 is provided by the user and can vary for each application. By organizing the query optimizer in this manner, the optimizer is made extensible and independent of a particular data model. Additional operators and rules can be added to the DBI 140 without effecting the search engine. Likewise, the search engine can be applied to a variety of data models without altering its structure.

The Database Implementor (DBI) 140 is a user-defined set of data definitions and methods that define a user's data model. The DBI can contain three parts: (1) the data model definitions 142 that list the operators and methods of the data model that are to be considered when constructing and comparing plans; (2) rules 144 for transforming the expressions in the query tree into one or more plans; and (3) search heuristics 146 that efficiently guide the search process to generate viable plans.

In the preferred embodiment, the data model distinguishes between operators and methods. An operator corresponds to a primitive provided by the data model. Examples of operators include join, intersection, and select. A method is a computer procedure that implements the operator. For example, hashjoin and mergejoin are methods that implement the operator join. An operator can often be implemented using several alternative methods.

Operators and methods are defined by data declarations. Furthermore each method has an associated code segment that implements the method. The following example illustrates a data declaration used in a particular data model.

$$\% \text{ operator } 2 \text{ join} \tag{1}$$

$$\% \text{ method } 2 \text{ hash\_join loops\_join cartesian\_product} \tag{2}$$

In this example, the keyword operator and method are followed by a number to indicate the arity and are followed by a list of associated operators or methods. The operator join has an arity of 2 thereby requiring two inputs. The method declaration indicates that the three methods hash_join, loops_join, and cartesian_product have an arity of 2.

The second part of the DBI contains the transformation and implementation rules. A transformation rule defines a legal transformation of an expression. An implementation rule defines the correspondence between an operator and a method. A user can specify the rules by data definitions as illustrated by the following example.

$$\text{Join } (cut_1, cut_2) \rightarrow ! \text{Join } (cut_2, cut_1) \tag{3}$$

$$\text{Join } (cut_1, cut_2) \text{ by Hash\_Join } (cut_1, cut_2) \tag{4}$$

The first line of this example defines the join commutativity transformation rule. The arrow is used to indicate the legal direction of the transformation.

In this example, the arrow combined with the exclamation mark is used to indicate that the rule is applied only once since applying a join commutativity rule twice results in the original form. The second line of this example defines an implementation rule specifying that the Hash_Join method is a suitable implementation of a Join.

The expression on the left side of a rule is considered the pattern and the expression on the right side is the substitute.

The inputs of the rule's pattern are represented by a special operator called a "cut" operator. A cut operator matches any other expression. The pattern indicates a logical operator, such as join, having a prescribed form, such as two inputs $cut_1$ and $cut_2$ and in a particular order where input $cut_1$ is considered the first input and input $cut_2$ is considered the second input. The substitute indicates either a logical or physical operator having a prescribed form. In the above example, the substitute for the transformation rule is a join operator having the inputs in the reverse order as the pattern. The substitute for the implementation rule specifies the hashjoin operator having two inputs and in a particular order.

A rule is applied by matching the rule's pattern with an expression and producing a new expression having the form specified by the substitute. Each operator in the expression is matched with each operator in the pattern in the same position. For example, when the Join commutativity rule (specified in equation (3) above) is applied to expression Join (scan $t_1$, scan $t_2$), the Join operator of the expression is matched with the Join operator of the rule's pattern. The expression scan $t_1$ is matched with the first input and the expression scan $t_2$ is matched with the second input. The result of the application of the rule is an expression having the form of the substitute which is Join (scan $t_2$, scan $t_1$).

The third part of the DBI consists of search heuristics that guide the optimizer's search. The search heuristics can contain the following:

- match methods that match a particular operator with a rule's pattern;
- cost functions that associate a cost with a particular expression;
- promise functions that reorder the rules to be applied on expressions, or suppress the application of rules on certain expressions;
- cutoff methods that limit the number of rules applied on a certain expression; and
- guidance methods that generate information pertaining to the selection of rules for subsequent rule applications.

The cost functions are used to generate a cost for a particular operator. The traditional combination of expected CPU time and I/O time can be used as a basis for determining this cost.

The match methods, promise functions, cutoff methods, and guidance methods are used to determine the rules that are to be applied to a particular expression. Match methods are used to match an operator with a rule's pattern. Promise functions have an associated value that indicate the usefulness of a rule in a particular context. The cutoff methods also have an associated value that is used to determine which rules are to be applied to a particular expression. A further elaboration of these concepts will be described in more detail below.

The guidance methods produce guidance structures which are heuristics that are passed from one task to another and are used to select rules which will generate more promising solutions. The heuristics capture knowledge of the search process which is passed onto subsequent tasks in order to eliminate generating unnecessary and duplicate expressions. The optimizer of the present invention utilizes a task structure where each task operates in an independent manner. As such, there is no communication between tasks. The guidance structures serve as a means to pass search information from one task to subsequent tasks in order to effect future search activity.

Guidance is provided at different points in the search process. (For the purpose of this application, the terms guidance and guidance structure are used interchangeably). The search process entails an exploration phase and an optimization phase (which is explained in more detail below). During the optimization phase, plans are generated through the application of rules for one or more expressions. Guidance is provided to efficiently select those rules that will produce more promising plans in light of the previous search activity. This guidance (e.g., optGuidance) is provided after an application of a rule creates a new logical expression and when plans are sought for an expression's children (e.g., outInputGuidance). In the exploration phase, all possible logical expressions that match a rule's pattern are generated. Guidance is provided during this phase in order to eliminate the generation of unnecessary logical expressions in light of previous transformations. This guidance is provided whenever a group (e.g., explInputGuidance) or an expression (e.g., explGuidance) is explored.

For example, in exploring an expression guidance can be provided to indicate that a join commutivity should not be applied twice to an expression. Further, when exploring a join pattern, it may be unnecessary to apply a rule that transforms a union operator or a scan operator into a logical expression that does not involve joins. Guidance can also be used to enable rules that are not usually enabled, such as a rule that considers a more unusual algorithm such as a bitmap-index scan.

Search Data Structure

In the preferred embodiment, the query optimizer utilizes a search data structure denoted as Memo. Memo is a search tree that is used to store expressions that are analyzed during the search. The Memo is organized into equivalence classes denoted as groups. Each group consists of one or more logical and physical expressions that are semantically equivalent to one another. Initially each logical expression of the input query tree is represented as a separate group in Memo. As the optimizer applies rules to the expressions in the groups, additional equivalent expressions are added.

Referring to FIGS. 3A–3D, the Memo 122 consists of one or more groups 302, where each group 302 contains an array of pointers 304 to one or more logical expressions, an array of pointers 306 to one or more physical expressions, an array of pointers 308 to one or more contexts, and a pattern memory 310. Each logical expression 304 is represented as a data structure that stores the particular expression 328 and has pointers 330 to the group of each input expression. Each physical expression 306 is represented as a data structure that stores the particular expression 311, the physical properties associated with the expression 312, the cost 314 associated with the expression, an array of pointers 316 to the context for each input, an array of pointers 318 to the groups of each input expression, and the pass 319 at which the physical expression was generated.

A context 308 is a data structure that contains one or more plans for a particular group. A plan is a physical expression that is assigned physical properties and a cost that is within the desired cost limit. Various physical expressions are created during the search process. Some of these physical expressions do not form plans because their cost exceeds the cost limit. Such expressions are not deleted from the Memo 122 structure even though they do not form plans. They are distinguished from the plans by the fact that they are not assigned a physical property and a cost.

A context 308 includes a pointer 320 to the current plans the required physical properties 322, the cost limit 324, and a list of candidate plans 326. For a particular expression, there may be several plans that meet the cost limit 324. The list of candidate plans 326 includes a pointer to each of these physical expressions.

The pattern memory 310 is a mechanism for tracking which pattern of transformations (e.g., join commutativity, etc.) have been performed on each logical expression in a group. It is used to prevent the search engine from repeating transformations that have already taken place. The pattern memory 310 can consist of n-bits where each bit represents a particular transformation pattern. For example, the first bit can represent join commutativity, the second bit can represent join associativity, and so on.

The following example illustrates the Memo structure 122. FIG. 15A illustrates a query tree representing the input query Join (Join (scan $t_1$ scan $t_2$), scan $t_3$). The initial Memo structure 122 for this expression is shown in FIG. 15C. There are five groups initially and each group contains one of the expressions contained in the input query. Group 0 contains the logical expression scan $t_1$; group 1 contains the logical expression scan $t_2$; group 2 contains the logical expression Join (scan $t_1$, scan $t_2$); group 3 contains the logical expression scan $t_3$; and group 4 represents the entire input query which is the expression Join (Join (scan $t_1$, scan $t_2$), scan $t_3$). Logical expressions that have inputs are represented by a data structure 304 that specifies the top logical operator 328 and has pointers to the groups that contain each input 330. For example, the expression Join (scan $t_1$, scan $t_2$) is represented in group 2 as a logical expression containing the Join operator with inputs contained in group 0 and group 1. Representing an expression in this manner allows the expression in group 2 to utilize any equivalent expression in groups 0 and 1 as the respective input. In this example, there is only one expression in each group. However, as the search procedure proceeds additional equivalent expressions will be added to these groups.

Figure 15Q:
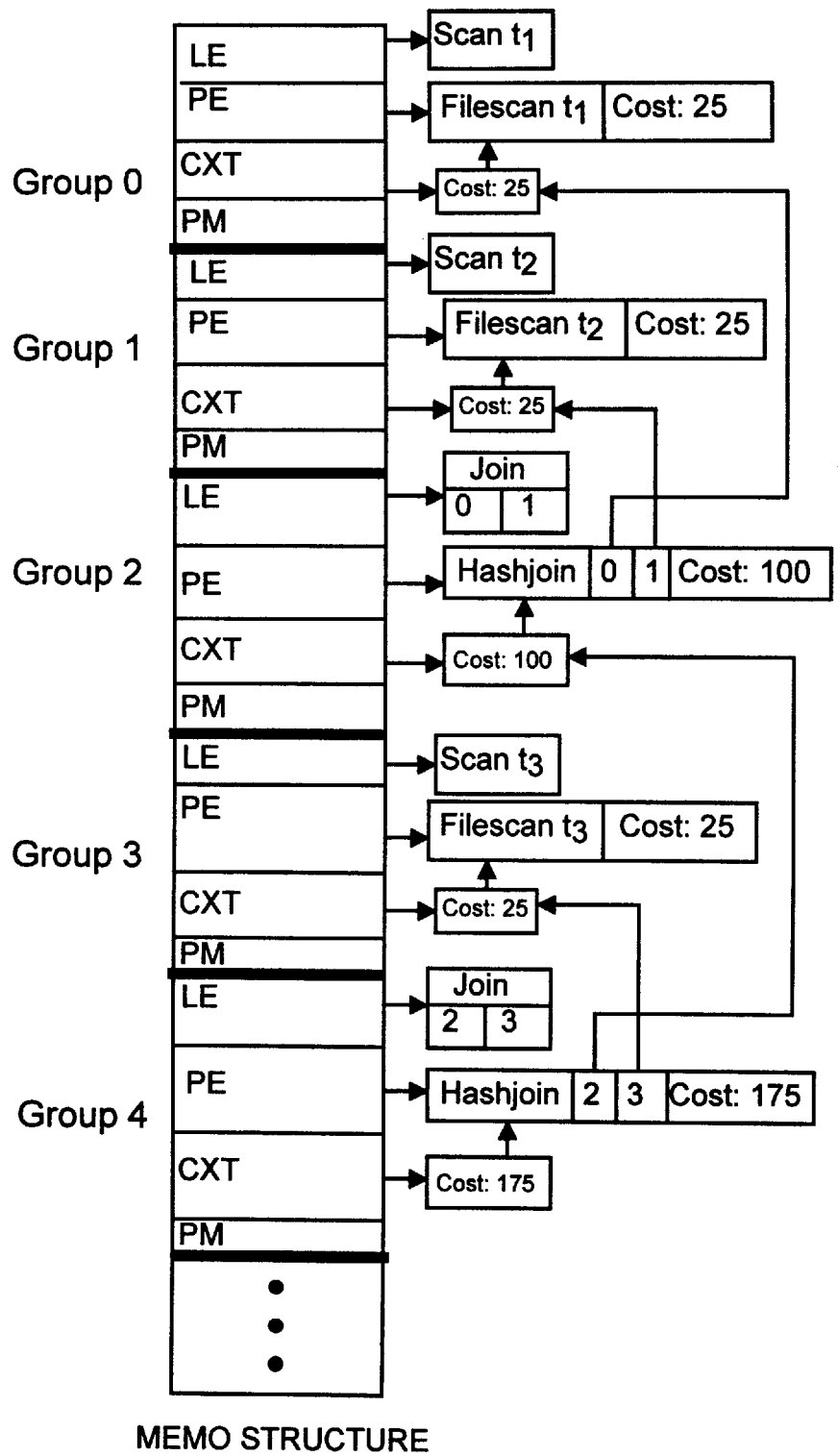

FIG. 15Q illustrates the Memo structure 122 of the preceding example after one optimization pass has been performed. Group 0 consists of the logical expression scan $t_1$, and has a context which points to the physical expression Filescan $t_1$, denoting that this physical expression is a plan for the group. Group 1 has a logical expression scan $t_2$ and has a context which points to the physical expression Filescan $t_2$, denoting that this physical expression is a plan for the group. Group 2 has the logical expression Join (group 0, group 1). There is one context associated with this group that indicates a single plan consisting of the physical expression Hashjoin (group 0, group 1). Group 4 contains a plan for the input query consisting of Hashjoin (Hashjoin (filescan $t_1$, filescan $t_2$, filescan $t_3$).

Search Procedure

The query optimizer of the present invention utilizes a search procedure to generate a number of feasible solutions from which an optimal solution is selected. Initially a feasible solution is generated whose associated cost is used as an upper bound for searching for other solutions. The search continues generating other solutions eliminating those that have an associated cost that exceeds the upper bound. When the search has exhausted all candidate solutions, the solution having the lowest cost is selected as the optimal solution.

The search procedure generates a solution by partitioning the input query into one or more subproblems when the input query consists of nested expressions. An expression is defined recursively as containing an operator with zero or more inputs that are expressions. Each subproblem contains one or more expressions. The subproblems form a tree in which some of the subproblems are inputs to other subproblems. A solution for each input subproblem is generated before a solution for its associated parent subproblem is generated. Thus, the subproblems are analyzed in accordance with an order that traverses the subproblem tree in a bottom-up manner. Those subproblems not having inputs are analyzed first making it possible to graduate up the tree to subproblems utilizing these inputs.

The inputs are numbered such that the left-most input is considered the first input, the right-most input is considered the last input, and those inputs in between are numbered sequentially relative to the first and last input. The input subproblems are analyzed sequentially where the first input is analyzed first, the second input is analyzed next, and so on. Once all the subproblems are analyzed, a solution for the database query is obtained as the combination of the solutions for each of the subproblems. This process is repeated for each additional solution.

For each subproblem for which a solution is desired, a set of rules is selected that is used to generate the solution space for the particular subproblem. The set of rules can consist of both transformation and implementation rules. These rules are used to generate one or more solutions for the particular subproblem. The choice of rules is selected so as to constrain the size of the solution space to feasible solutions rather than all possible solutions. This selection is guided by the various functions in the DBI (e.g., guidance methods, promise functions, search heuristics, and cutoff functions).

The set of rules is determined when a solution for the particular subproblem is sought. It can consist of both implementation rules and transformation rules. An implementation rule transforms a logical expression into a physical expression and a transformation rule transforms a logical expression into an equivalent logical expression. The interleaving of both of these types of rules to generate a solution when needed eliminates unnecessary transformations that will not result in a viable solution.

Once the set of rules or solution space for a particular subproblem is determined, the search procedure employs a branch and bound technique to determine which solutions to generate. This search is performed for each subproblem for which a solution is sought. Solutions whose associated cost does not exceed an upper bound are generated while those that exceed this bound are pruned. This eliminates the number of solutions that need to be considered thereby producing a more efficient search procedure.

The search procedure partitions the query tree into a number of subproblems based on the rules selected for transforming the expressions in the query tree into physical expressions. The search procedure starts at the root expression selecting one or more rules for transforming the logical operator included in the root expression into an equivalent physical expression. The root expression is often considered a subproblem. Based on the rule applied, the query tree is further partitioned into one or more subproblems where each subproblem contains expressions requiring equivalent physical expressions. Often each input to a rule is considered an additional subproblem. The input subproblem can then be partitioned further into additional subproblems based on the rules selected for application to the top expression contained in the subproblem.

Each subproblem can be optimized or explored. In optimizing a subproblem, one or more rules, including any combination of implementation and transformation rules, are applied to one or more operators in the subproblem in order to generate a plan. By exploring a subproblem, one or more transformation rules are applied to one or more operators in the subproblem in order to generate additional equivalent expressions. Exploration typically occurs when the input to a rule specifies a particular operator rather than a cut or tree operator (the tree operator is described in detail below). Exploration is performed on a subproblem immediately preceding the optimization of the subproblem. This is done in order to produce equivalent expressions or groups that can be utilized in the optimization step. By performing explorations in this manner, only those equivalent expressions that will produce more promising solutions in the subsequent optimization are generated rather than all possible transformations.

Figure 16A:
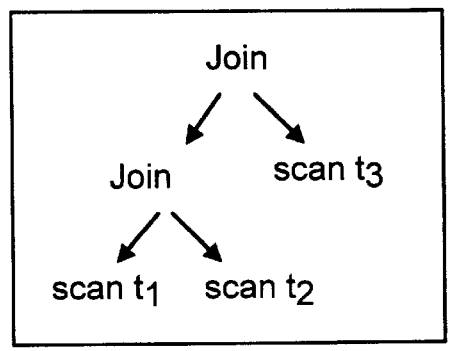
FIGS. 16A–16C illustrate an example of the subproblem partitioning by the search procedure in a preferred embodiment of the present invention.
Figure 16B:
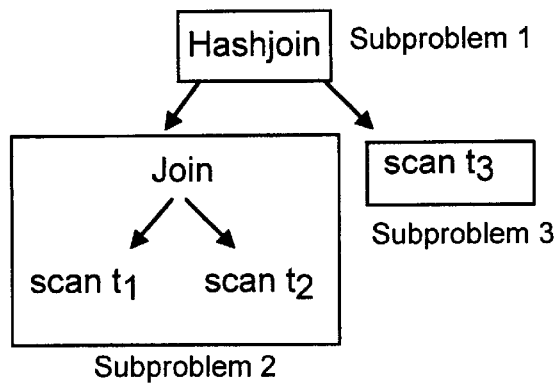
Figure 16C:
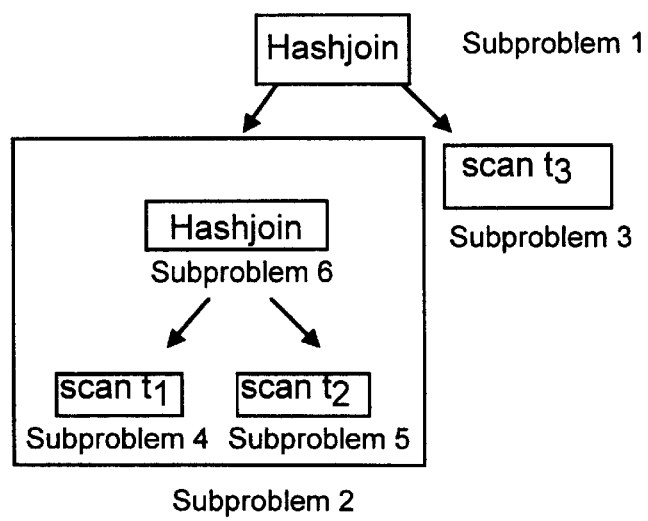

FIGS. 16A–16C illustrate an example of the subproblem partitioning used by the search procedure. FIG. 16A represents the input query or query tree. A first rule is selected for application to the root Join operator. This application partitions the input query into three subproblems as shown in FIG. 16B. Subproblem 1 corresponds to the root expression. Subproblems 2 and 3 each represent an input.

In this example, the first rule specifies a Join operator for its first input. In this case, subproblem 2 is first explored through the application of one or more transformation rules. Thereafter, subproblem 2 is optimized which results in the Hashjoin rule applied to the top Join operator and subproblem 2 is further partitioned into subproblems 4, 5, and 6. Solutions for subproblems 4 and 5 are generated first in order to generate a solution for subproblem 6 which in this case represents subproblem 2.

The Memo search structure tracks each solution or plan considered by the search engine, even those that are eliminated from consideration due to their excessive cost. However, duplicate expressions can be generated during the search process. A redundancy check is performed before an expression is stored in the Memo search structure. This check eliminates the retention of duplicate expressions in the Memo search structure.

In a preferred embodiment of the present invention, multiple optimization passes are performed. In a multiple pass optimizer, a subsequent pass can utilize solutions obtained in a previous pass. The computational time of the subsequent pass is minimized since it does not need to repeat solutions obtained previously since they are already stored in the Memo search structure. Furthermore, each physical expression contained in a plan is identified with the pass in which it was generated. As subsequent passes are made, the optimizer considers the existing plans as candidate plans and continues to generate additional solutions whose cost does not exceed any one of the candidate plans.

Figure 17:
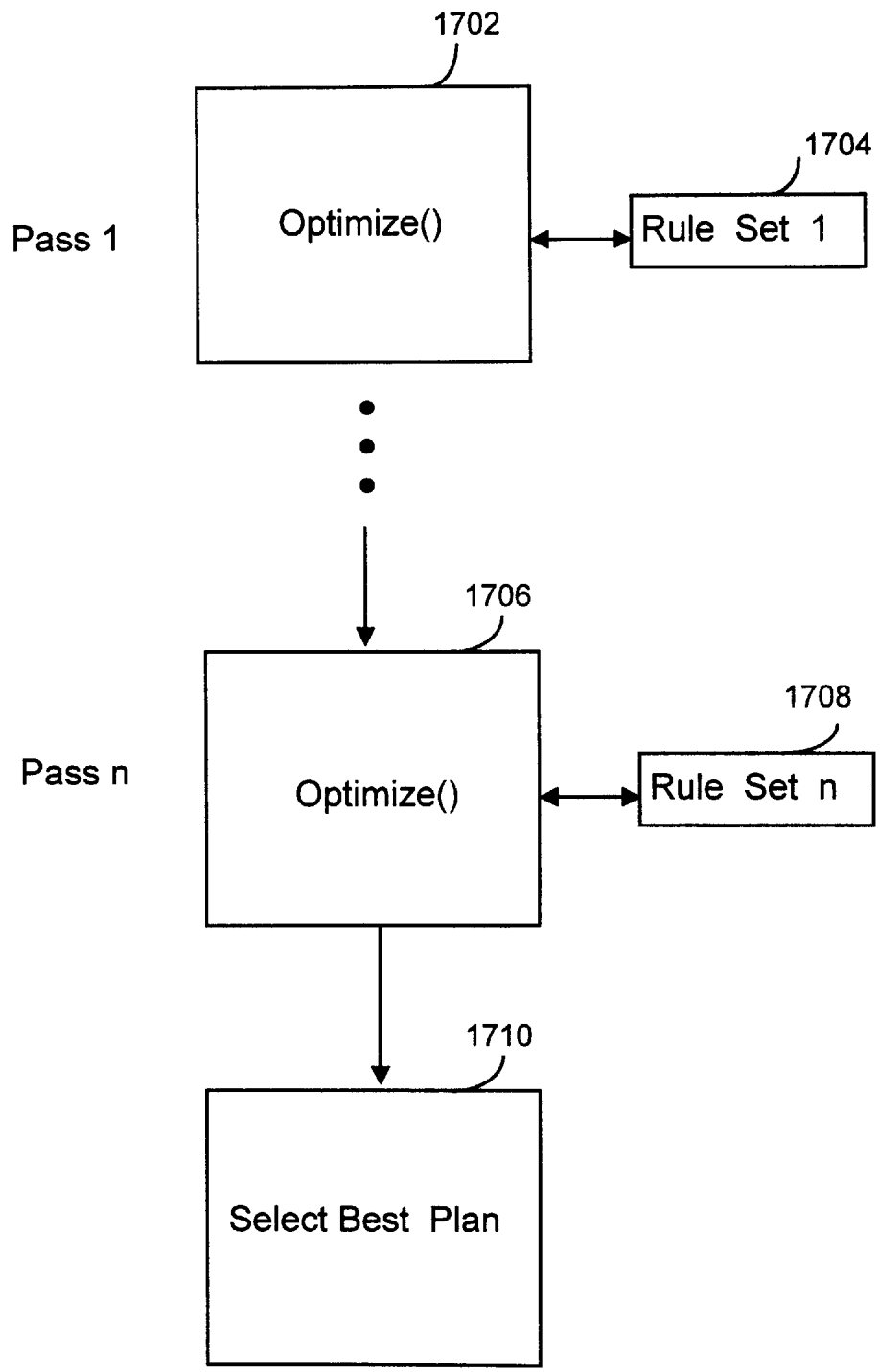
FIG. 17 illustrates the multipass optimization scheme.

Referring to FIG. 17, in the preferred embodiment of the present invention, a first pass (step 1702) through the optimizer is used to generate one or more solutions for the input query. In this first pass, only a subset of the rules 1704 is used to generate the solutions. Preferably, this subset consists of implementation rules since they generate physical expressions and hence plans more readily. In subsequent passes (step 1706), additional rules 1708 are available in order to add plans to the solution space. At the completion of the desired number of optimizations passes, a best plan is selected (step 1710).

Task Structure

The aforementioned search procedure is implemented by the search engine as a set of tasks. Each task performs predefined operations and invokes one or more additional tasks to continue the search if needed. Each task terminates upon completion of its assigned operations. A task stack is utilized to store tasks that are awaiting execution and is preferably operated in a last-in-first-out manner. A task scheduler reads tasks from the top of the task stack and schedules one or more of the tasks that are pending execution.

The task structure is advantageous for providing parallel searching in a multiprocessor environment. The task structure can be represented by a program dependence graph that captures dependencies or the topological ordering among the tasks. This ordering is then used by the task scheduler to schedule one or more of the tasks to execute on one or more processors.

The task structure is also more amenable for an object-oriented processing environment. Preferably, each task can be represented as an object with each object having an associated method defining the operations to be performed. Task objects offer more flexibility since a task object can be instantiated several times for different situations and each instantiation can be placed onto the task stack for execution.

Appendix 1 lists a pseudocode representation of the procedures executed by the Optimize_Group task. Appendix 2 lists a pseudocode representation of the procedures executed by the Optimize_Expression task. Appendix 3 lists a pseudocode representation of the procedures executed by the Explore_Group task. Appendix 4 lists a pseudocode representation of the procedures executed by the Explore_Expression task. Appendix 5 lists a pseudocode representation of the procedures executed by the Apply_Rule task. Appendix 6 lists a pseudocode representation of the procedures executed by the Optimize_Inputs task. The pseudocode used in Appendices 1–6 is essentially a computer language using universal computer language conventions. While the pseudocode employed here has been invented solely for the purposes of this description, it is designed to be easily understandable by any computer programmer skilled in the art.

Figure 4:
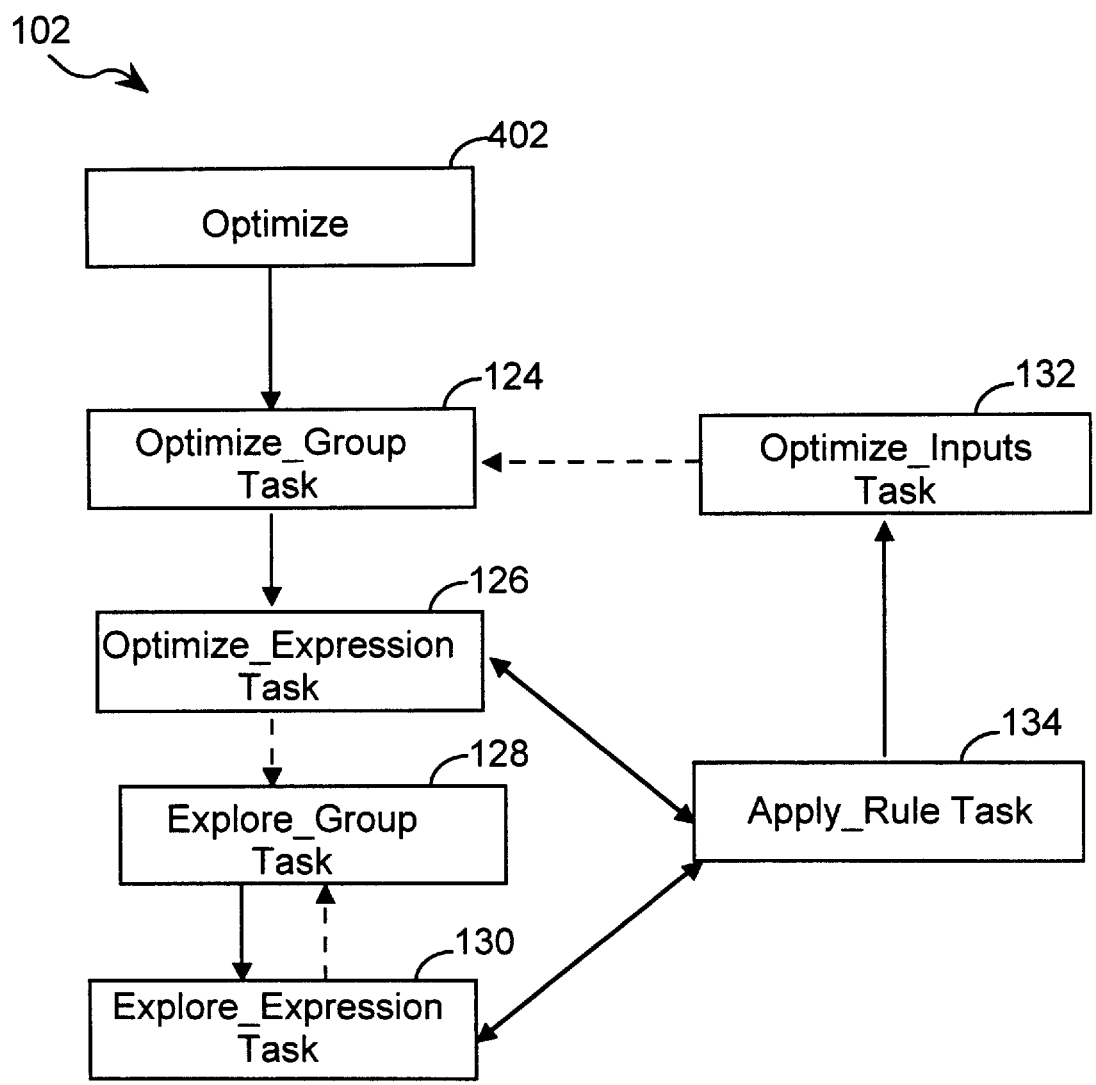
FIG. 4 is a block diagram of the task structure in a preferred embodiment of the present invention.

FIG. 4 illustrates the tasks used by the search engine and the interactions between them. The tasks are structured such that each one performs certain operations and then invokes one or more other tasks to perform other related operations, if necessary. Once a task completes its assigned operations, it terminates. The solid arrows indicate the manner in which one task invokes another task whereas the dashed arrows indicate where invocations of a task are made for the children of an expression.

Figure 5:
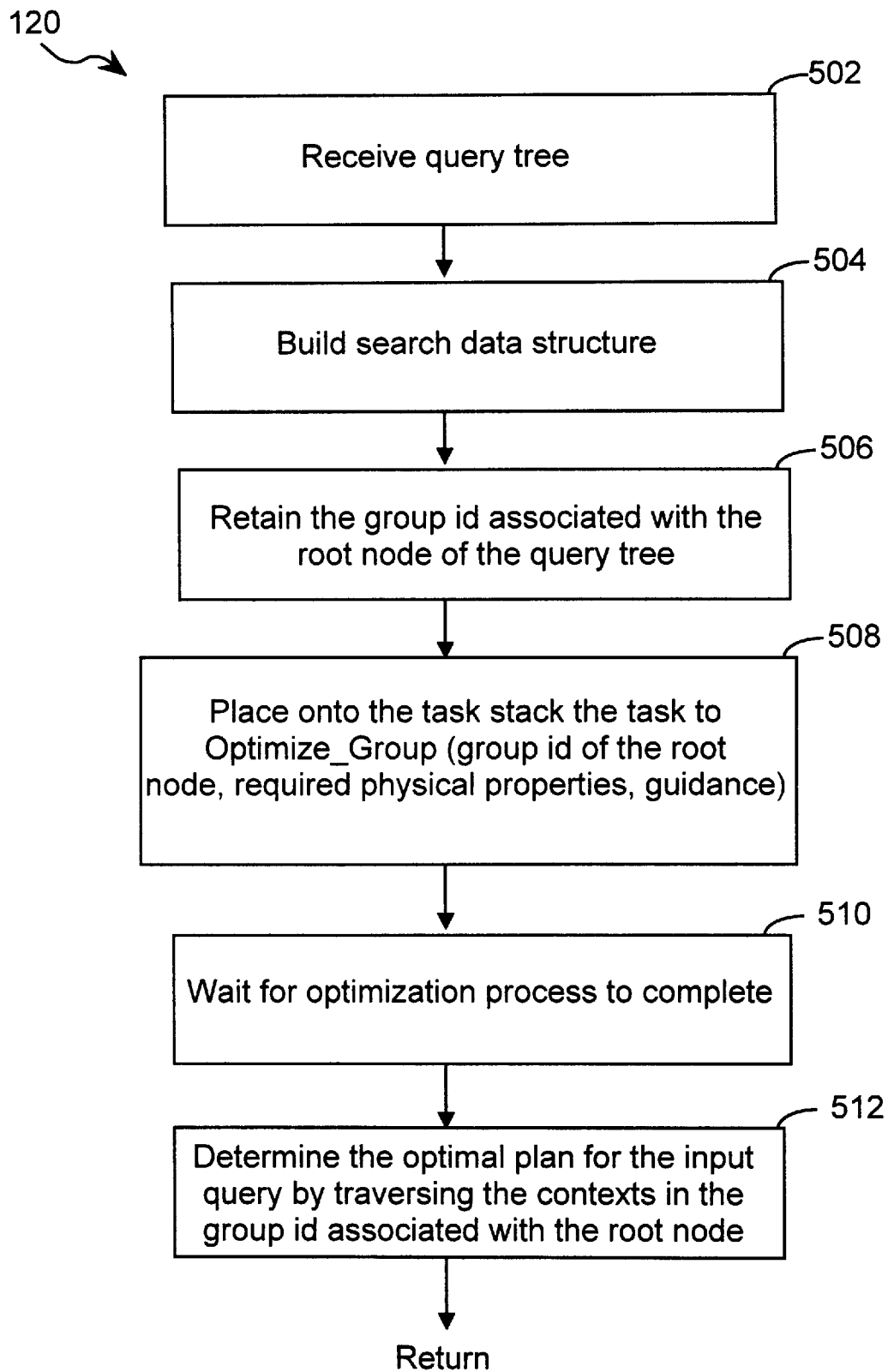
FIG. 5 is a flow chart of the preferred embodiment of the optimize procedure of the present invention.

Referring to FIGS. 4 and 5, the optimize procedure 402 receives an input query 148 in the form of a query tree 204 (step 502) and builds a Memo search data structure 122 containing each logical expression in the query tree 204 (step 504). Initially, each node of the query tree 204 contains an expression that is placed in a separate group in the Memo 122 (step 504). Next, the group number containing the root node of the query tree is retained (step 506). This will be used at a later point to retrieve the plans generated for the input query. The optimize procedure 402 then places onto the task stack the Optimize_Group task 124 with the group number of the root node and the required physical properties (step 508). The procedure then waits for the completion of the optimization process which is indicated by the task stack being empty (step 510). At the completion of the optimization process, the contexts in the group number of the root node are scanned. The plan having the lowest cost is selected as the optimal plan to execute the input query (step 512).

The Optimize_Group task 124 is used to obtain a plan for a specified group having certain physical properties. If no such plan exists, the task initiates those tasks that will generate one or more plans for the specified group having the required physical properties.

Figure 6:
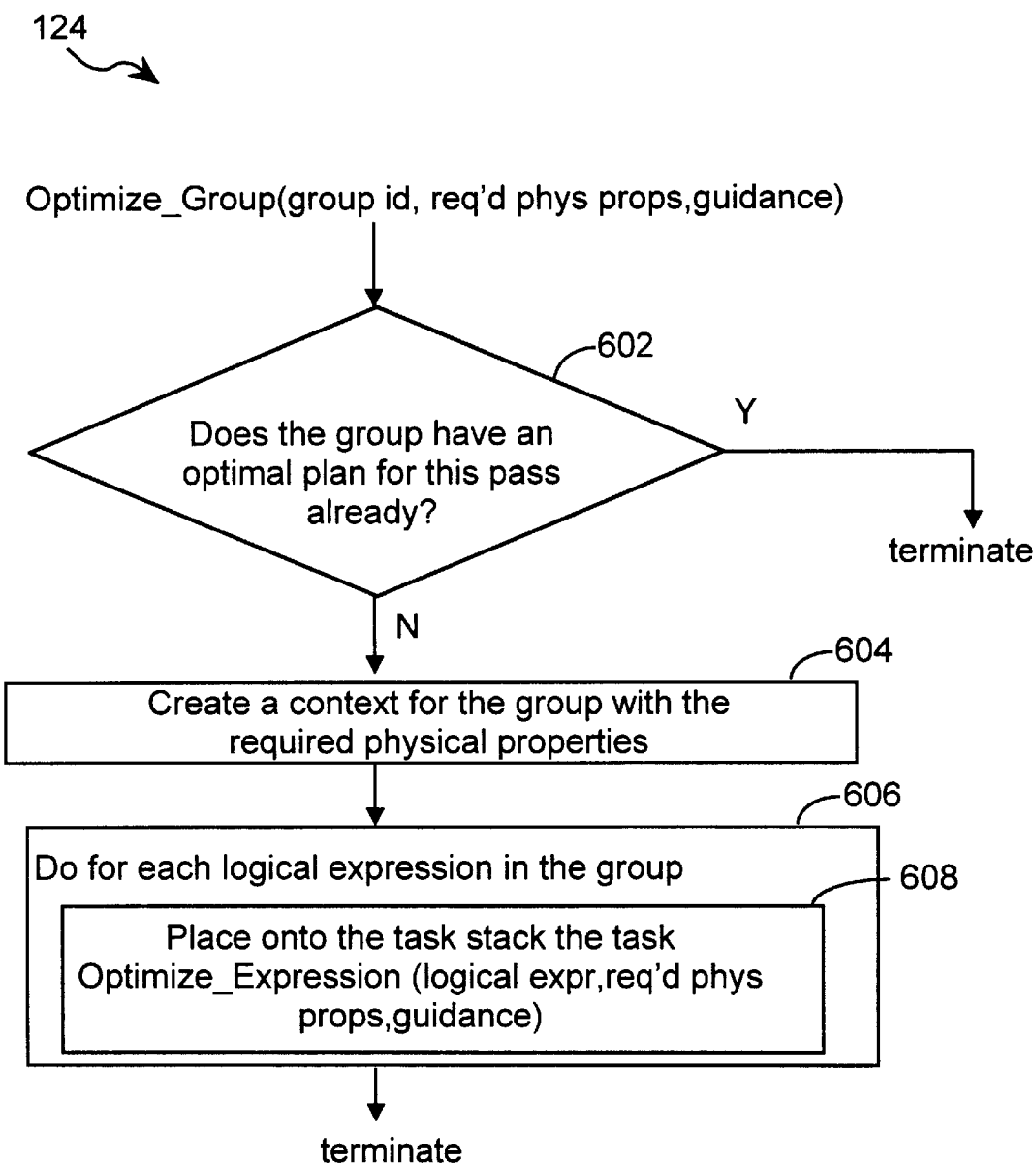
FIG. 6 is a flow chart of the Optimize_Group task in a preferred embodiment of the present invention.

Referring to FIG. 6 and Appendix 1, the Optimize_Group task 124 determines whether an optimal plan for the pass matching the required physical properties exists for the specified group (step 602). This is done by searching the contexts associated with the group for one that has the required physical properties. If a plan exists for this context, the task terminates. If a plan exists having more stringent physical properties than those requested, then the stringent plan is considered a suitable plan for this request. For example, if the request is for a plan having the required physical properties of "sorted by (a)" and a plan exists for the physical property "sorted by (a,b)", the latter plan will have satisfied the request.

Next, the process proceeds to create a context for this group with the required physical properties (step 604). The cost limit in this context 324 is initialized to a Null value if no plan exists for this group and no external cost limit is supplied. However, if a non-optimal plan exists that has the required physical properties, the cost limit of this context 324 is set to the cost of the existing plan. The physical properties associated with the context 322 is set to the requested physical properties. When a plan is generated for this group with the requested physical properties, it will be associated with this newly created context.

This task proceeds by pushing onto the task stack the Optimize_Expression task 126 for each logical expression contained in the group with the required physical properties. The Memo structure stores all the logical expressions associated with this group.

Figure 7:
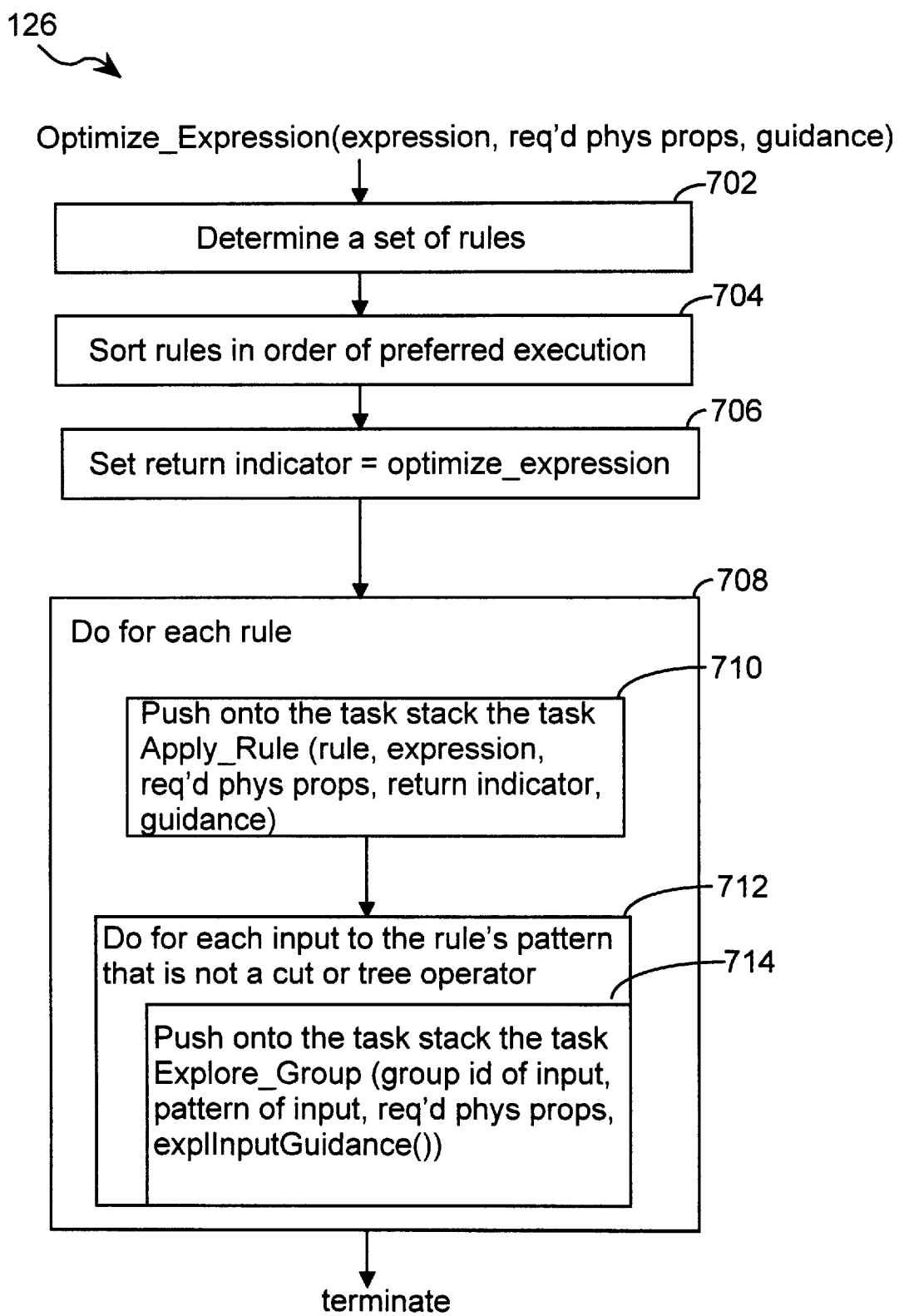
FIG. 7 is a flow chart of the Optimize_Expression task in a preferred embodiment of the present invention.

Referring to FIG. 7 and Appendix 2, the Optimize_Expression task 126 is used to select a set of rules for use in generating additional logical and physical expressions associated with the specified logical expression. Each rule is then applied in a certain order. For certain rules that have an explicit operator as an input other than a cut or tree operator, exploration transformations on the input are performed before a rule is applied. This ensures that all possible logical expressions are available before the rule is applied.

The rules that are selected for application for a particular logical expression are a function of the DBI. As noted above previously, the DBI contains search heuristics in the form of match functions, promise functions, cutoff methods, and guidance methods. These search heuristics are utilized in determining which rules to use. The match methods identify those rules having an operator that matches a particular expression. The guidance structures specify information concerning the future search activity based on past search operations. The promise functions associate a value with each rule indicating how suitable the particular rule is for the particular expression. The cutoff methods limit the number of rules that are applied for a particular expression. The limit is considered the cutoff point.

Referring to FIG. 12, for each logical expression a table is produced 1200 that contains an entry for each applicable rule 1202 and its associated promise function 1204. The table is sorted by decreasing promise values where the first entry in the table 1200 contains the rule having the highest promise value and the last entry in the table 1200 has the lowest promise value. A cutoff point 1206 determines which rules are applied and which are ignored.

In the example shown in FIG. 12, rules 1, 2, and 8 are applied since their respective promise values exceed the cutoff point 1206.

Referring back to FIG. 7, the table 1200 stores the rules in a preferred order of execution which is based on the promise value associated with a rule (step 704). A return indicator is set to identify the Optimize_Expression task 126 (step 706) as the task which invoked the Apply_Rule task 134. This is to ensure that in the event a new logical expression is produced, additional transformations for the new expression are generated.

Next, the task processes each rule in accordance with the preferred order of execution (step 708). Since the stack is operated in a FIFO order, the last rule to be executed is pushed onto the stack first and the first rule to be executed is pushed onto the stack last. The Apply_Rule task 134 is pushed onto the task stack for each rule (step 710). For each input to the rule that is not a cut operator or a tree operator, the Explore_Group task 128 is pushed onto to the stack with the group identifier of the input, the pattern of the input, the required physical properties, and a new guidance structure obtained from the method explInputGuidance (step 714). The Explore_Group task 128 will ensure that all possible exploration transformations for this pattern are produced before the rule is applied.

The following example serves to illustrate the need for exploration (i.e., Explore_Group task). FIG. 13A illustrates the Leftshift rule having the pattern Join (Join ($cut_0$, $cut_1$), $cut_2$) and the substitute Join (Join ($cut_0$, $cut_1$, $cut_2$). The cut operators $cut_0$ and $cut_1$ indicate that any expression can replace the cut operator and can be used as an input to the Join operator. The pattern for this rule specifies that the first input is a Join operator, not a cut or tree operator. In this situation, the Explore_Group task is utilized to perform transformations on the expression tree Join ($cut_0$, $cut_1$) so that when the expression is optimized (in this case by utilizing the Hashjoin rule) the physical expressions having the form as shown in FIG. 13B can be generated.

Without performing the exploration first, only the first physical expression illustrated in FIG. 13B is generated.

Figure 8:
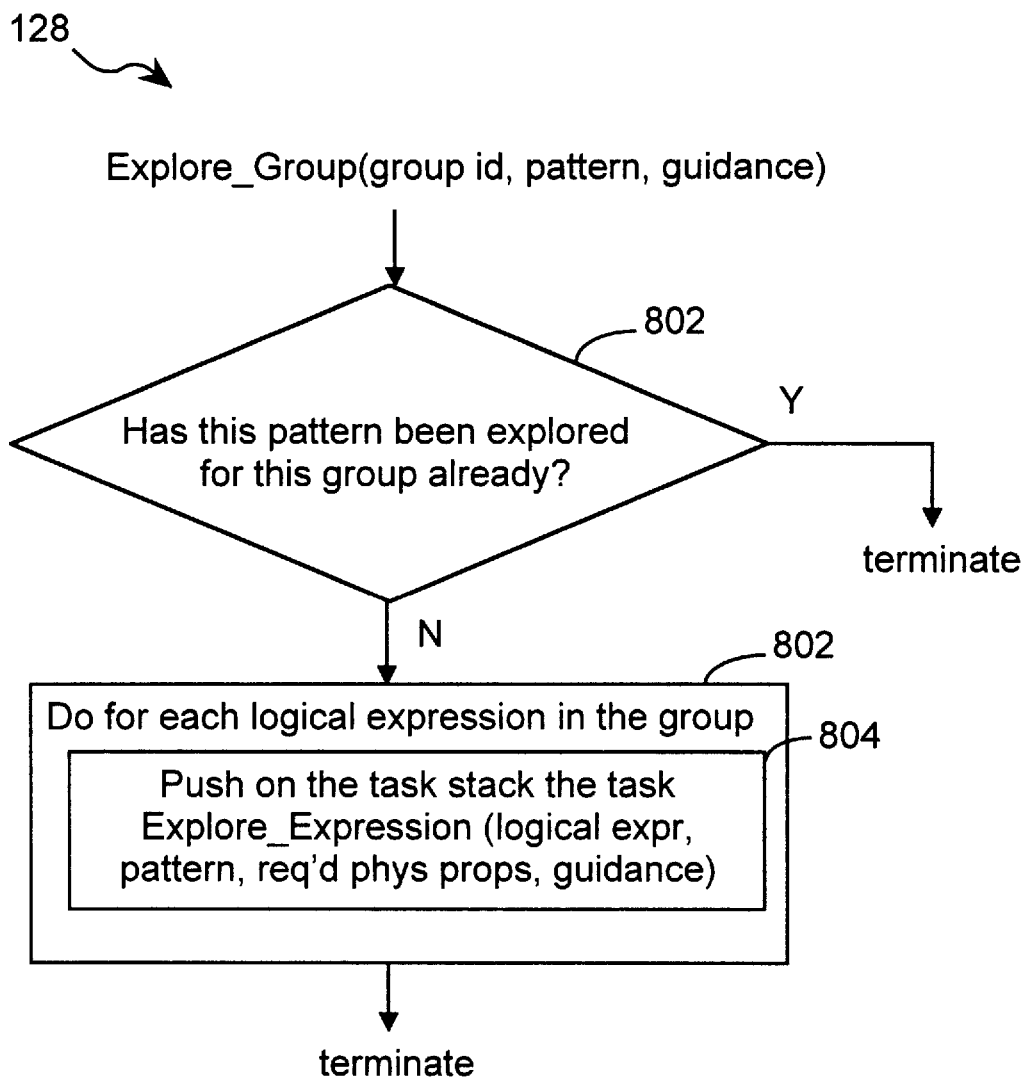
FIG. 8 is a flow chart of the Explore_Group task in a preferred embodiment of the present invention.

Referring to FIG. 8 and Appendix 3, the Explore_Group task 128 is used to check if a particular pattern representing a logical transformation has been applied to a specific group. This ensures that all possible bindings will occur when the Apply_Rule task 134 is performed. However, this function needs to be performed only once and it is for this reason that the Explore_Group task 128 checks if a particular pattern has been applied for the group (step 802). This check is accomplished by checking the pattern memory 310 associated with the requested group. As noted above previously with reference to FIG. 3, the pattern memory is a bit map consisting of n bits where each bit represents a particular pattern. The Explore_Group task 128 checks the associated bit for this particular pattern. If it is set, then the pattern has been explored for this group and the task terminates (step 802-Y).

In an alternate embodiment, the pattern memory for each group can consist of a single bit indicating that all possible transformation rules in the DBI have been applied to the group. Thus the Explore_Group task 128 will not just explore a particular pattern rather all transformation patterns available in the DBI. When the pattern memory bit is set, it will indicate that all transformation patterns have been applied thereby alleviating the need to perform any transformations. When the pattern memory bit is clear, each transformation rule in the DBI is applied to each logical expression in the group and upon completion the pattern memory bit is set.

If the particular pattern has not been applied to this group (step 802-N), the task pushes onto the task stack the Explore_Expression task 130 (step 804) for each logical expression in the specific group (step 802) for the particular pattern.

Figure 9:
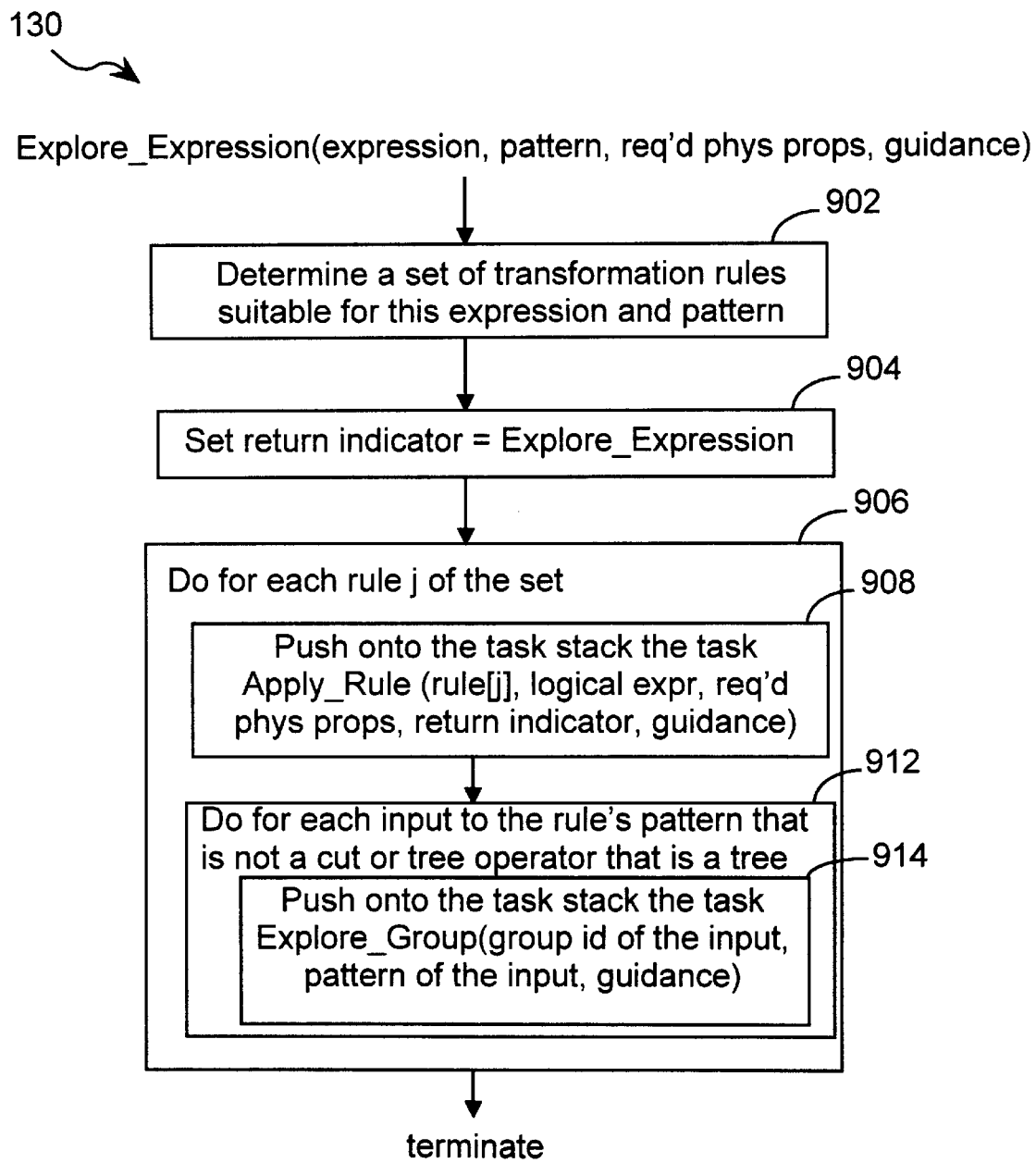
FIG. 9 is a flow chart of the Explore_Expression task in a preferred embodiment of the present invention.

Referring to FIG. 9 and Appendix 4, the Explore_Expression task 130 is used to apply a particular pattern to a specific expression thereby generating a new logical expression as specified by the pattern. First, a set of suitable transformation rules for this particular expression and pattern are selected in a similar manner as described in reference to FIG. 7 (step 902). A return indicator is set to Explore_Expression in order for the Apply_Rule task 134 to proceed with further processing once a new logical expression is generated (step 904). Each rule is applied in a specified order (step 906) and a Apply_Rule task 134 is pushed onto the task stack for each rule along with the specified logical expression, the required physical properties, return indicator, and guidance (step 908). For each input to a rule that is not a tree or cut operator (step 912), the Explore_Group task 128 is pushed onto the task stack along with the group identifier for the input, the pattern of the input, and the guidance (step 914).

The Apply_Rule task 134 is used to implement a rule thereby creating a new expression. The application of a rule matches an expression's operators in the same position as specified in the rule's pattern and produces an equivalent expression as specified in the rule's substitute. Prior to applying a rule to an expression, the Apply Rule task 134 finds all possible bindings that match the rule's pattern. The purpose of a binding is to find all possible expressions that can match a rule's pattern. Bindings are often encountered for rules that span more than one level and which have specific patterns for one or more input expressions. An input expression is denoted in the Memo structure 122 by its corresponding group identifier. This implies that any expression in the group can be used as the input expression. A binding serves to associate a particular expression for each input expression specified in a rule's pattern.

The concept of a binding is represented in FIGS. 14A–14D. FIG. 14A shows the Memo structure for the input query, FIG. 14B shows the rule's pattern that is to be applied to the expression shown in FIG. 14C (which is the expression associated with Group 4), and FIG. 14D shows the two possible bindings for this expression. The rule's pattern indicates that the top operator can be any Join operator and that the left input is also any Join operator. The expression in Group 4 has as its top operator a Join operator with two inputs, one from Group 2 and a second input from Group 3. The binding process will select an expression from Group 2 that has a Join operator. In this example there are two such examples and as such will produce two different bindings for the expression in Group 2. The process stops binding expressions if the pattern is a cut node. Thus, for this example, the two bindings shown in FIG. 14D are generated.

Figure 18A:
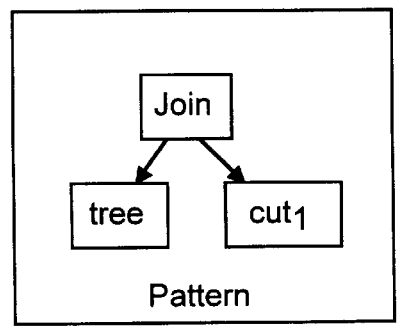
FIGS. 18A–18D illustrate an example of binding tree operators.
Figure 18B:
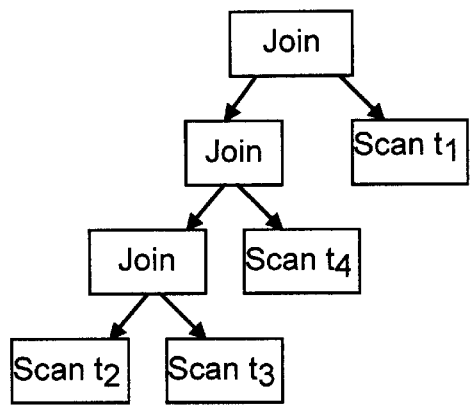
Figure 18C:
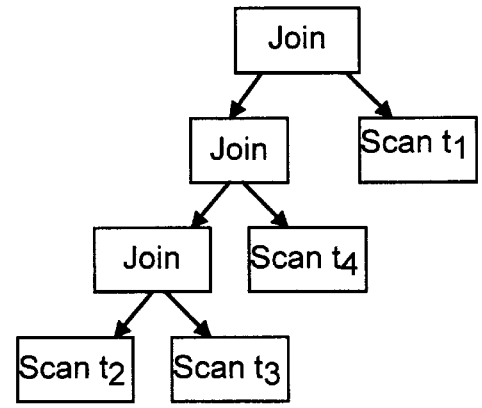
Figure 18D:
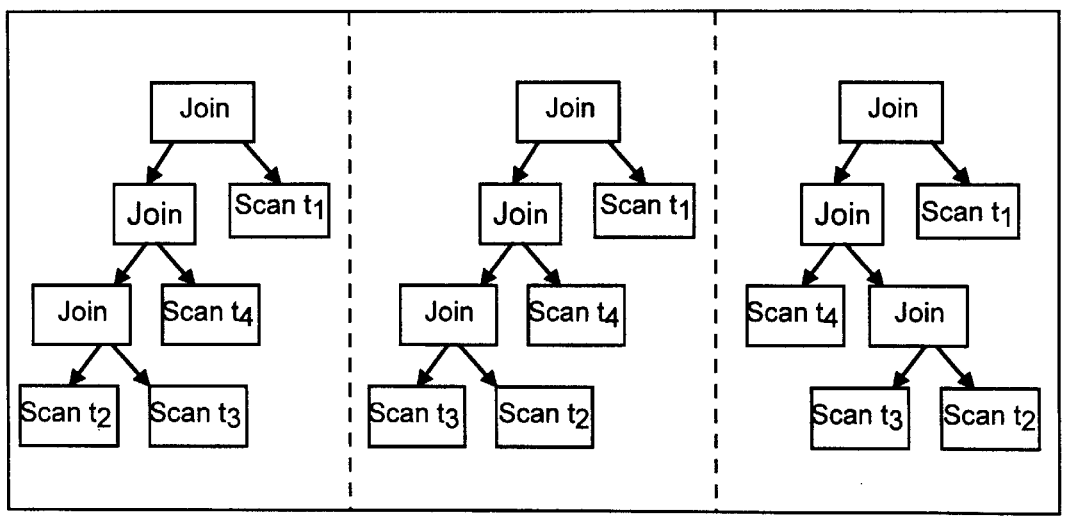

The concept of binding as applied to tree operators is represented in FIGS. 18A–18D. A tree operator is an input to a rule's pattern that is matched to an entire expression tree. FIG. 18A illustrates a rule whose pattern specifies a tree operator as its first input. FIG. 18B illustrates an input query. The rule shown in FIG. 18A is applied to the input query of FIG. 18B. There are two types of tree operators. For the first type, one binding is generated for the tree operator and this is shown in FIG. 18C. In the second type, all possible bindings that match any pattern below the tree operator are generated. An example of a subset of these bindings is shown in FIG. 18D.

As seen from the above example, tree operators are advantageous since they are more flexible in defining rules and avoid the use of multiple rule applications to achieve a desired pattern.

Once all the possible bindings are generated, the rule can be applied. The application of a rule can generate one or more substitutes. Typically, a rule's substitute is not known ahead of time. Depending on the type of rule that is applied, subsequent tasks are invoked to continue the search process of generating a plan. In the case where an implementation rule is applied, a new physical expression is created. In order for a plan to be generated from this physical expression, plans for each of its inputs need to be obtained.

Thus, the Optimize_Inputs task 132 is invoked. In the case where a new logical expression is generated as a result of exploring an expression, additional logical transformations are generated for the new expressions (invocation of the Explore_Expression task 130). In the case where a new logical expression is generated as a result of optimizing an expression, additional logical and physical transformations are applied to the new expression (invocation of the Optimize_Expression task 126).

Figure 10:
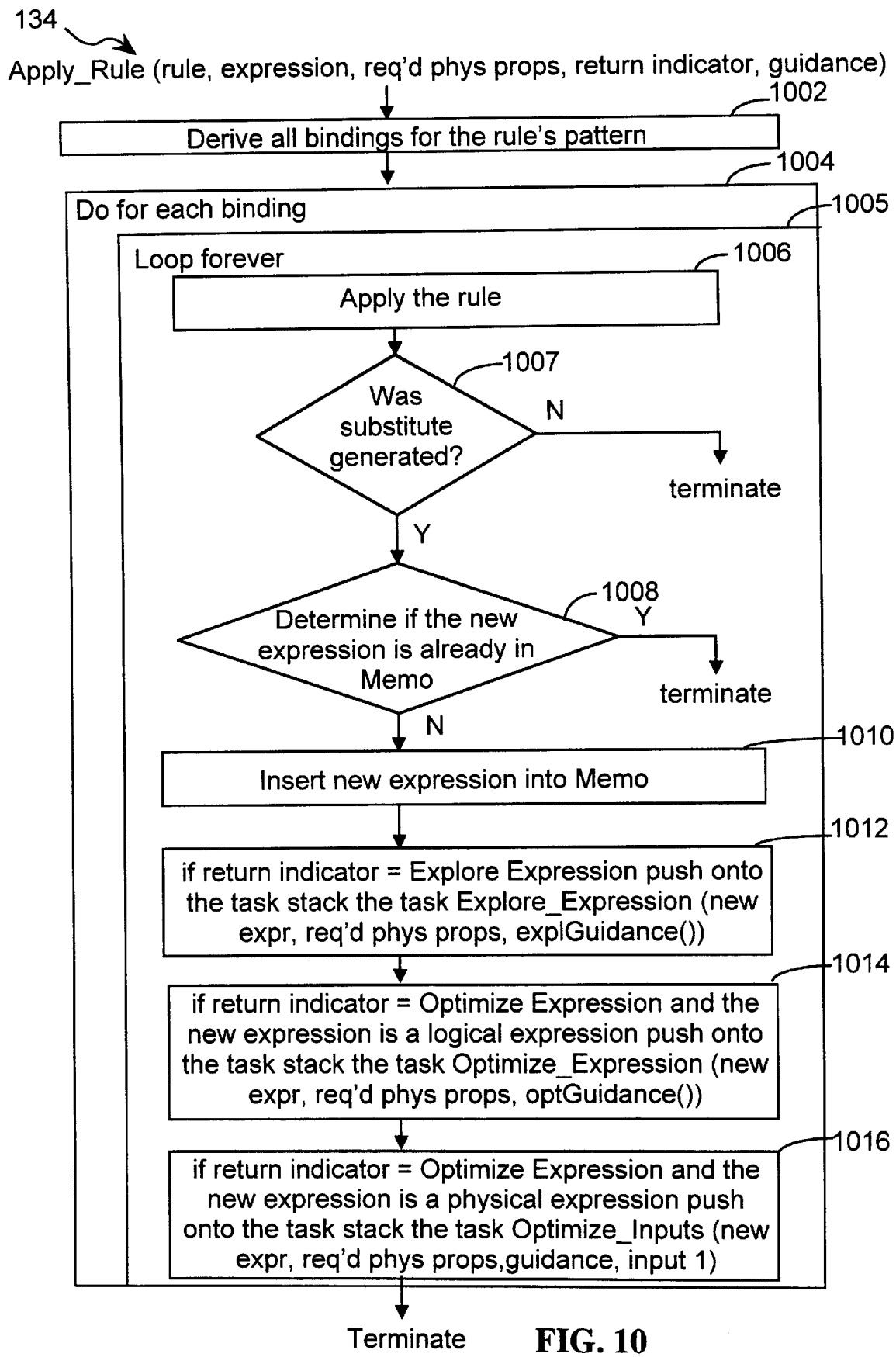
FIG. 10 is a flow chart of the Apply_Rule task in a preferred embodiment of the present invention.

Referring to FIG. 10 and Appendix 5, the Apply_Rule task 134 determines all bindings for the specified rule (step 1002). Next, the task iterates for each binding (step 1004). Since a rule can produce one or more substitutes, the task loops while a substitute is generated (step 1005). The rule is applied (step 1006) and if no substitute is generated (step 1007-N), the task terminates. Otherwise, if a substitute was generated (step 1007-Y), a new expression is created in accordance with the rule's substitute. If the new expression is already in the Memo structure 122 (step 1008-Y), the task terminates. Otherwise, it is inserted as follows (step 1008-N). Each expression in the Memo structure 122 is assigned a hash value that is based on its contents and the groups of its inputs. The hash values are stored in a hash table. When a new expression is generated, a hash value is determined for the expression. If it exists in the hash table then the new expression is a duplicate and not inserted in the Memo structure 122. If the hash value does not reside in the hash table, the new expression is inserted in the Memo structure 122 and the corresponding hash value is inserted in the hash table. When an implementation rule is applied, a new physical expression is inserted and when a transformation rule is applied, a new logical expression is inserted.

Next, the Apply_Rule task 134 places onto the task stack 136 the next task to continue the processing associated with the substitute. The return indicator dictates the appropriate task. If the return indicator indicates that the Apply_Rule task 134 was invoked from an Explore_Expression task 130, the task 134 proceeds to push onto the task stack 136 the Explore_Expression task 130 for the newly generated expression with the required physical properties and the guidance structure (step 1012). If the return indicator is set to Optimize_Expression and the newly created expression is a logical expression, the task 134 pushes onto the task stack 136 the task Optimize_Expression with the newly generated expression, the required physical properties, and with a new guidance structure generated by the method optGuidance() (step 1014). If the return indicator indicates Optimize_Expression and the newly generated expression is a physical expression, the Apply_Rule task 134 pushes onto the task stack 136 the task Optimize_Inputs 132 with the new expression, the required physical properties, the guidance, and an indicator specifying the first input (step 1016).

Figure 11:
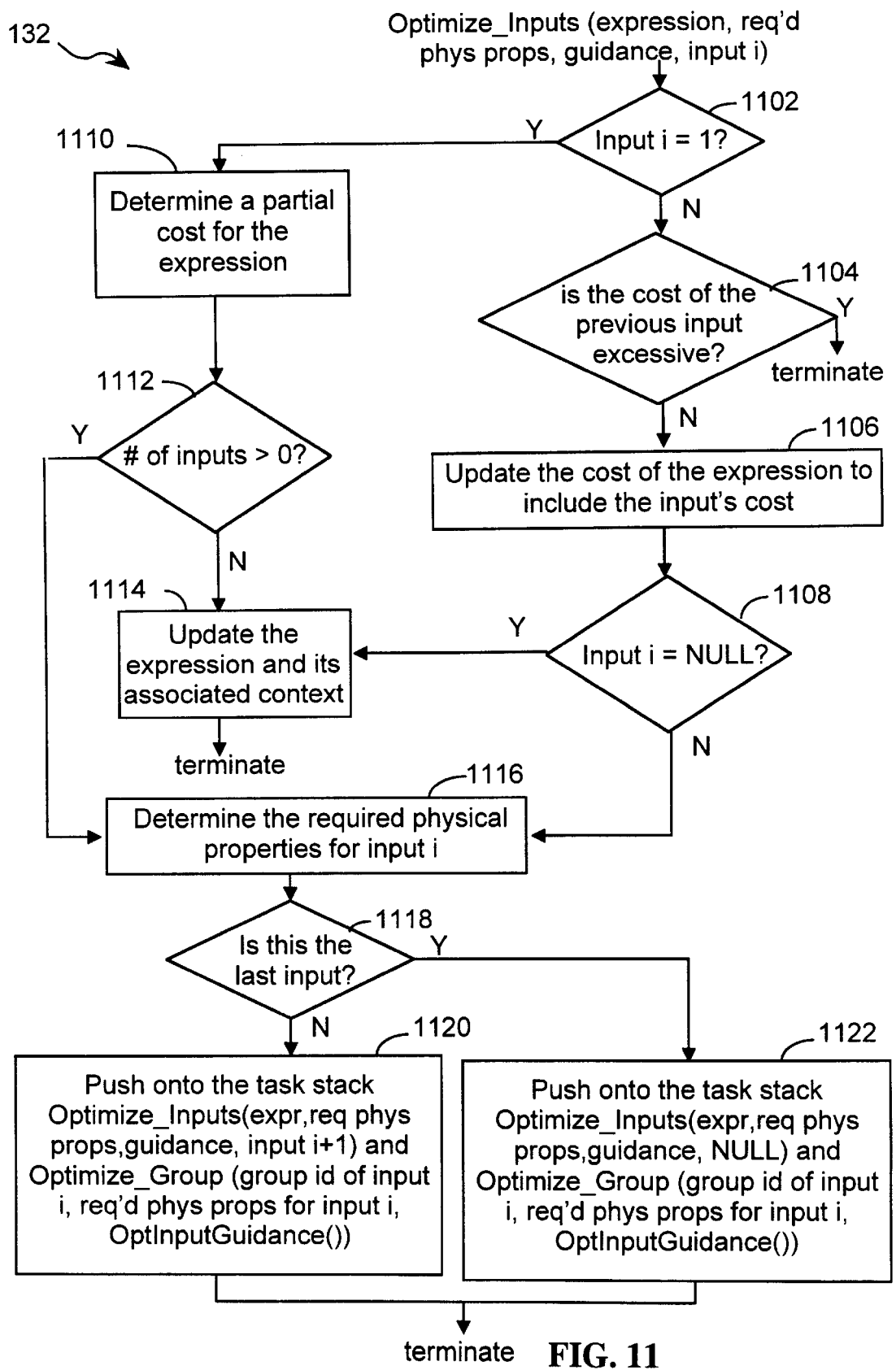
FIG. 11 is a flow chart of the Optimize_Inputs task in a preferred embodiment of the present invention.

FIG. 11 and Appendix 6 describe the steps used in the Optimize_inputs task 132. The goal of the Optimize_Inputs task 132 is to find a plan (or solution) for the expression that is passed to the task. This consists of finding a plan for each input to the expression. A plan for the expression will be generated if the cost for the plan does not exceed a prescribed upper bound (which is the cost limit contained in the context for the associated expression). As each input's plan is generated, a check is made to ensure that the input's plan does not exceed the parent expression's upper bound. If this cost is exceeded, the parent expression's plan is abandoned and the task terminates.

The Optimize_Inputs task 132 initially computes the cost for the particular expression as a function of its operator and required physical properties. Thus, the first step is to determine whether this is the first execution of the task for this expression which occurs when input i is set to one (step 1102-Y). The costing function associated with the DBI is used to approximate a cost that reflects the CPU cost, I/O cost, communication and resource consumption of the expression. This cost is incremented with each input plan's cost.

If the expression does not have any inputs, a plan can be finalized for this expression (step 1114). This includes updating the context associated with the physical expression to have its current plan pointer 320 reflect the physical expression and to update the context's cost limit 324 to include the cost limit of the physical expression. The task then terminates.

If the task is not being performed for the first input, the cost of the previous input is analyzed (step 1104). The previous input plan's cost is contained in the context associated with the input plan. This is compared against the current cost for the expression and the cost limit for the parent expression's context which serves as an upper bound. If the plan for the input's cost exceeds the cost limit for the expression's context, the task is terminated (step 1104-Y). Otherwise (step 1104-N), the current cost for the expression is updated to include the cost of the input's plan (step 1106). Also, the physical expression's input context pointer 316 is updated to include the input's context.

Input i having a value of NULL signifies that all inputs have been processed and that a plan is to be generated for the expression. The task checks if input i is NULL (step 1108) and if so, finalizes a plan as described above (step 1114). Otherwise (step 1108-N), the required physical properties for input i are determined (step 1116). Next, the task places two additional tasks on the task stack to continue the search process. If the last input is being processed (step 1118-Y), an Optimize_Inputs task is placed with a NULL value for the input parameter and an Optimize_Group task for the last input (step 1122). For other inputs, an Optimize_Inputs task is placed onto the task stack for the next input i+1 and with the appropriate parameters and an Optimize_Group task for the current input i (step 1120). Lastly, the task terminates.

An Example of the Query Optimizer

The following section will describe the system and method employed by the query optimizer by way of the example illustrated in FIGS. 15A–15W. The focus of this example illustrates the execution path of the tasks used in the query optimization process and as such does not illustrate the entire functionality of the query optimizer. This example illustrates a two-pass optimization scheme. In the first pass, rule set 1 (see FIG. 15B) is used to generate a first solution that is used as an upper bound. In the second pass, rule set 2 is used to generate an additional plan. FIG. 15A shows the input query Join (Join (scan $t_1$, scan $t_2$), scan $t_3$) used in the example.

Initially, the Optimize procedure 120 receives the input query 148 and its required physical properties in the form of a query tree 204, builds a corresponding Memo search structure 122 as shown in FIG. 15C, and places an Optimize_Group task for group 4 onto the task stack 136 as shown in 15D. Since this is the only task on the task stack 136, the task scheduler 138 pops this task off the stack and executes it.

The Optimize_Group task will first check if a plan already exists for group 4 for this pass. This is done by searching the context pointer for group 4 which in this example is null. Next, a context for the group is created with its cost limit set to null. An Optimize_Expression task is placed onto the task stack 136 for each logical expression in group 4. In this example, group 4 has only one logical expression and it consists of the expression having a Join operator with inputs from groups 2 and 3. Therefore, as shown in FIG. 15E, the Optimize_Group task will place onto the task stack 136 an Optimize_Expression task for this particular expression and for the required physical properties. The task scheduler 138 will pop this task off the stack and execute it.

The Optimize_Expression task will determine a set of rules for use in generating one or more plans for this expression and an order for executing these rules. This consists of invoking the DBI and determining the appropriate rules as previously described above with reference to FIG. 12. In this example there is just one rule and it is pushed onto the task stack which is shown in FIG. 15F.

The task scheduler will pop the task from the top of the task stack 136 which is Apply_Rule (Hashjoin, Join (2,3), req'd phys props, OE, guidance). This task applies the Hashjoin rule to the logical expression Join (2,3) in group 4. First, all bindings that match the rule's pattern are generated. In this example, only one such binding is generated and it is shown in FIG. 15G. The rule is applied and only one substitute is generated which is the new physical expression shown in 15G (see substitute). Since the rule was an implementation rule, the resulting expression is a physical expression. The new physical expression is placed in the Memo structure. FIG. 15H illustrates the changes to group 4 as a result of this rule's application.

Next, the Apply Rule task pushes an Optimize_inputs task onto the task stack for the physical expression just generated with the required physical properties and the first input. FIG. 15I illustrates the task stack at this point. Since the Optimize_Inputs task is on the top of the stack, this task will be executed next.

The Optimize_Inputs task will determine a cost for the Hashjoin (group2, group3) expression based on its required physical properties and its content. For the purposes of this example, this cost will be 50. A cost is also computed for input i as well as the required physical properties. The Optimize_Inputs task then places another Optimize_Inputs task onto the task stack for the next input and an Optimize_Group task to obtain a plan for the first input. The task stack at this point is shown in FIG. 15J.

The task scheduler pops off the Optimize_Group task from the stack and executes it. It will first check if a plan exists for group 2. Since none exists for this group, it will create a context for this group and place onto the task stack an Optimize_Expression task for each expression in group 2. Group 2 has only one expression so there will be one Optimize_Expression task added to the task stack. The task stack at this point in shown in FIG. 15K. The Optimize_Group task terminates and the task scheduler will execute the Optimize_Expression task since it is on the top of the stack.

The Optimize_Expression task utilizes the DBI to determine a set of rules for generating a plan for this expression. In this example one rule will be selected and it is the rule Join $(cut_1, cut_2)$->Hashjoin $(cut_1, cut_2)$. The Optimize_Expression task places an Apply_Rule task onto the task stack for this rule and the expression in group 2. The task stack at this point is illustrated in FIG. 15L.

The task scheduler pops the Apply Rule task from the top of the task stack and begins to execute it. First, all possible bindings that match the rule's pattern is determined. In this example, one binding is applicable. The rule is, applied to the expression and the new physical expression is added to the Memo for group 2. In this example, there is only one substitute for this rule. FIG. 15M illustrates the Memo structure for group 2 at this point. Next, the Apply Rule task places an Optimize_Inputs task on the task stack to obtain plans for each of the inputs. FIG. 15N illustrates the task stack at this point.

The Optimize_Inputs task for the expression Hashjoin (0, 1) is executed next. This task computes a cost for this expression and for the purposes of this example it will be 50. The task then computes a cost and the required physical properties for the first input. Another Optimize_Inputs task is placed onto the stack for the next input as well as an Optimize_Group task to obtain a plan for the input in group 0 with the required physical properties. FIG. 15O illustrates the task stack at this point.

The Optimize_Group task for group 0 is executed next. The task searches for a plan for this group. Since none exists, it will create a context for this group with the required physical properties. An Optimize_Expression task is then placed onto the task stack for this expression. The Optimize_Expression task is then executed which determines that the rule scan(x)–>filescan(x) is applicable for this expression. The Optimize_Expression task will then place onto the task stack the Apply_Rule task and then terminate. The Apply Rule task will be executed which applies the rule and adds the resulting physical expression filescan $t_1$ to the Memo structure. An Optimize_Inputs task will then be placed onto the stack and executed. Since this physical expression has no inputs, a plan is readily created by updating the context associated with the expression to include the physical expression as the current plan and to update the context's cost limit with the cost of the expression. For the purposes of this example, the context's cost limit is 25. FIG. 15P illustrates the change to group 0 in the Memo structure as a result of this plan being created.

Processing resumes with the next task on the stack which is the Optimize_Inputs task for the expression Hashjoin (0, 1) for the second input. This task will check the cost associated with the plan for the first input that is in group 0 and compare it against the cost limit in the context associated with the Hashjoin (0, 1) expression. Since this is the first plan for this group with the required physical properties, the cost limit in the associated context is null: The cost for the Hashjoin (0,1) expression will be updated to include the first input's cost which we will assume to be 75. The task will then resume by finding a plan for the second input. This is done in a similar manner as was performed for the first input. Once the plan for the second input has been obtained and a check has determined that its associated cost is not excessive, a plan for the Hashjoin(0,1) expression can be formulated using the plans obtained for its inputs. The context associated with the Hashjoin(0,1) expression will have as its cost limit the costs for each input and the cost associated with the Hashjoin which in this case is 100. The context will also have as its current plan a pointer to the Hashjoin(0,1) expression.

The Optimize_Inputs task for the Hashjoin(2,3) expression for the second input is the next task that is executed. At this point it has obtained a plan for its first input and is seeking a plan for its second input. The Optimize_Inputs task will compute a cost for the second input and required physical properties and place onto the task stack an Optimize_Inputs task with a NULL input and an Optimize_Group task for group 3 with the newly generated required physical properties. The Optimize_Group task will proceed in a similar manner as previously described above generating an Optimize_Expression task, an Apply_Rule task and an Optimize_Inputs task. The results of these tasks will be a plan for the scan $t_3$ expression in group 3 which the Hashjoin(2,3) expression will utilize in its plan. The context associated with group 4 will point to the Hashjoin(2,3) expression as its current plan and have a cost limit of 175.

At the completion of the Optimize_Inputs task for the Hashjoin(2,3) expression, a plan will exist for each group. FIG. 15Q illustrates the Memo structure up to this point which is after the first plan is generated for the input query. Once the first plan has been generated, its cost limit will serve as an upper bound for pruning other plans that exceed this bound.

A second pass is then initiated utilizing the second rule set (see FIG. 15B) and the same Memo search structure from the first pass. This pass proceeds in a similar fashion as described above in reference to the first pass. An Optimize_Group task for group 4 is placed onto the task stack 136. The Optimize_Group task is immediately executed since it is the only task on the task stack. The Optimize_Group task will determine that the existing plan in group 4 was generated in a previous pass and to continue processing for a new plan for this pass. The Optimize_Group task places an Optimize_Expression task on the task stack for the logical expression Join(2,3) associated with group 4 and the corresponding parameters. The Optimize_Group task is executed and it places an Optimize_Expression task on the task stack for the Join(2,3) expression.

The Optimize_Expression task is then executed which selects the LeftShift rule (rule #1 in rule set 2). The LeftShift rule has as its first input a Join operator which causes the Optimize_Expression to explore group 2 before the LeftShift rule is applied. FIG. 15R illustrates the task stack at this point.

The next task to be executed is the Explore_Group task which will generate an additional logical expression for group 2. The Explore_Group task will first determine if the join commutivity pattern has been explored for this group previously. The appropriate bit in the pattern memory is checked. Since this is not the case, the task places onto the task stack an Explore_Expression task for the logical expression in group 2 with the required physical properties and the join pattern that is to be explored.

Figure 15U:
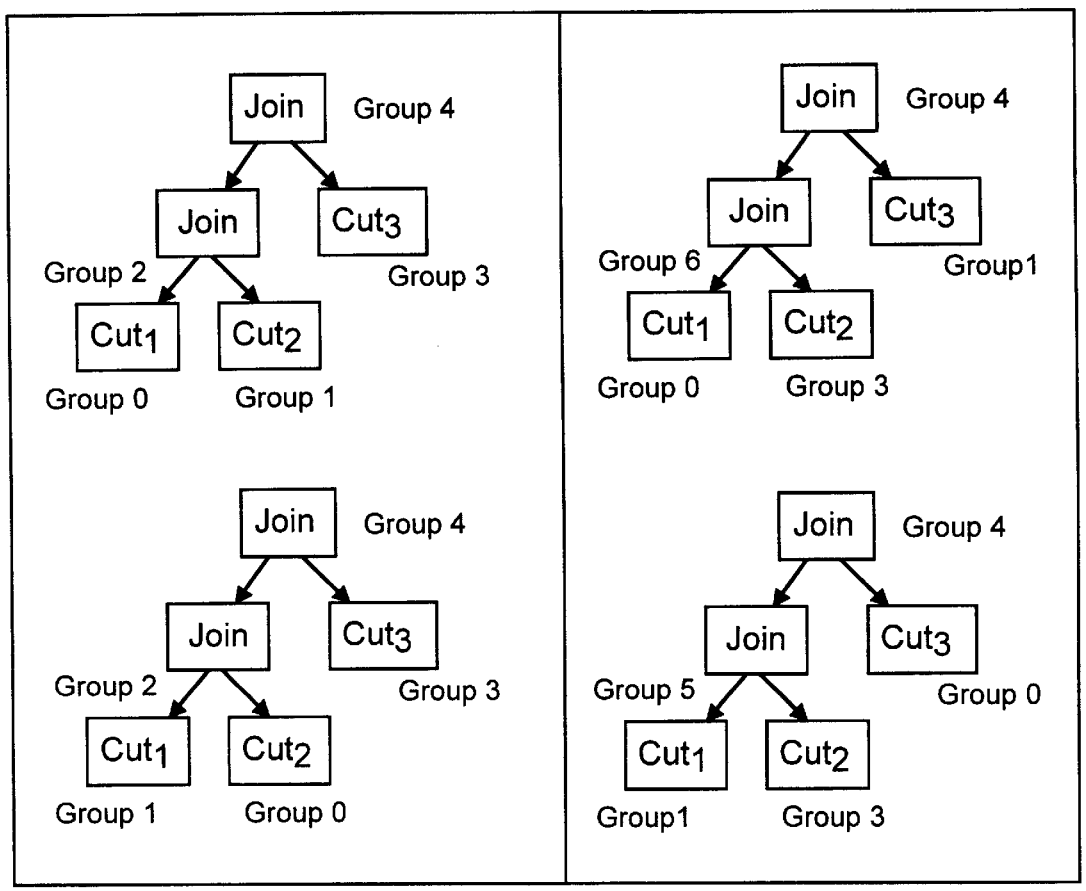
Figure 15W:
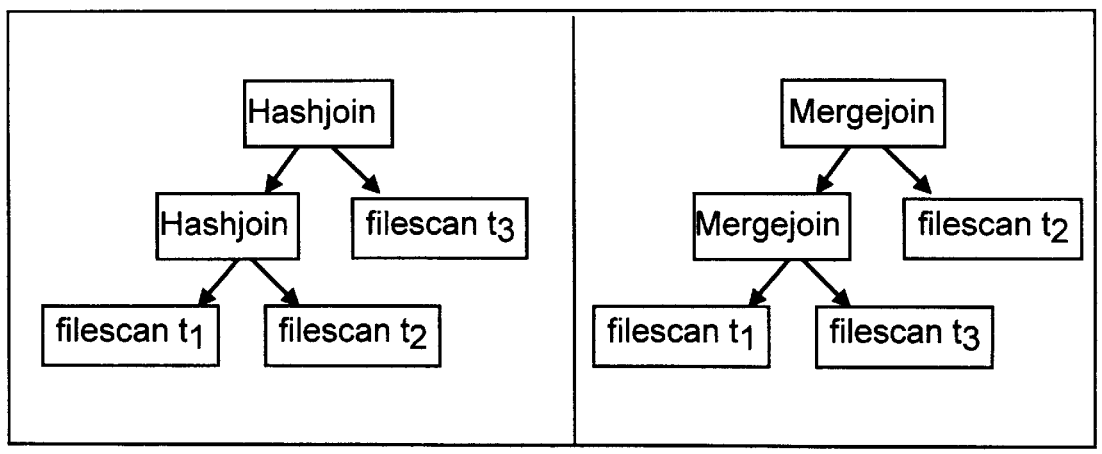
Figure 15V:
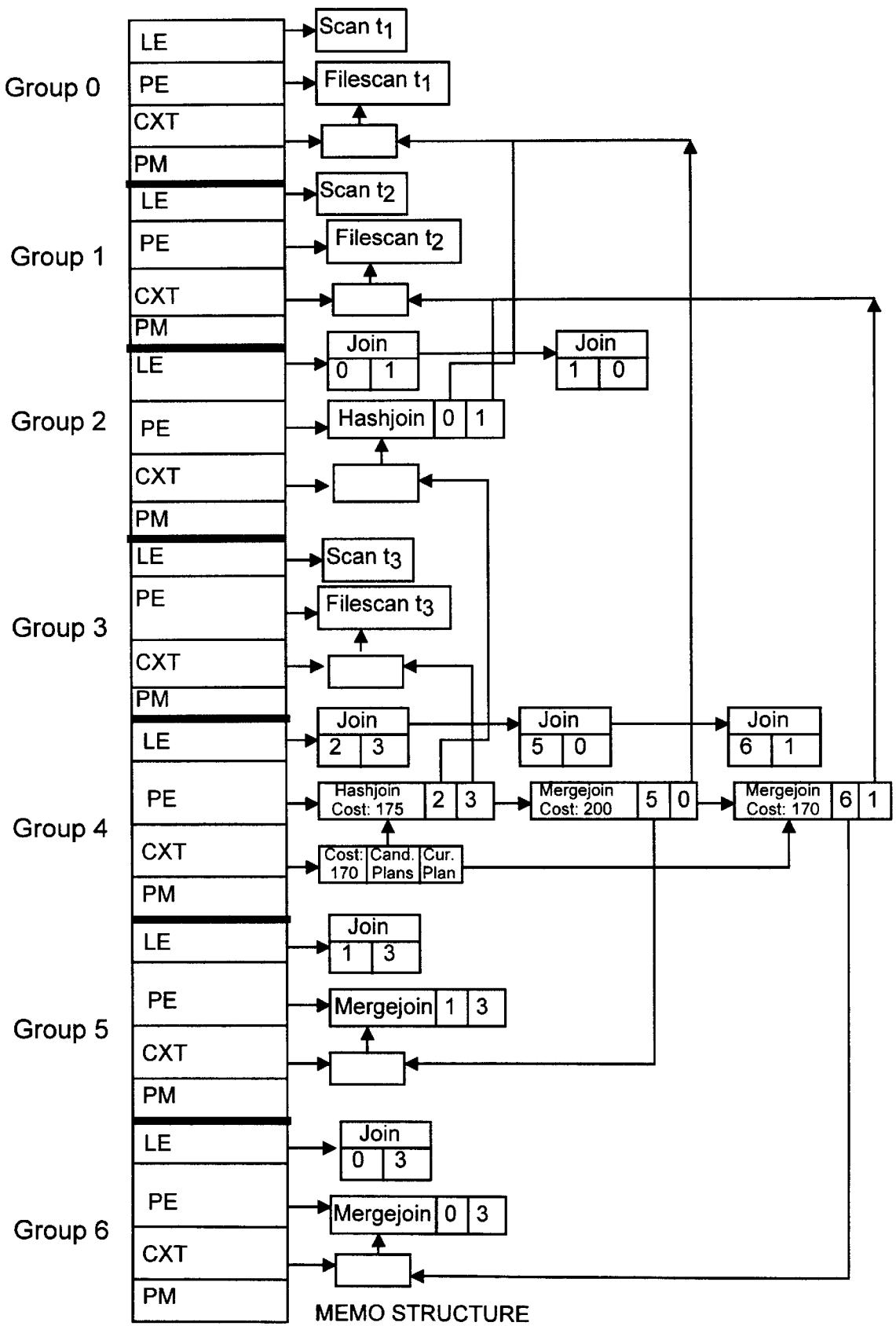

The Explore_Expression task will then execute and determine a set of suitable rules for exploring the expression. For this example, the join commutativity rule is selected (rule #3 in rule set 2 of FIG. 15B). The Explore_Expression task will push onto the task stack an Apply_Rule task and then terminate. The Apply_Rule task applies the rule adding a new logical expression to the group. It then places onto the task stack an Explore_Expression task for the new logical expression. The Explore_Expression task will execute and not apply any further processing for the new expression since it will determine that the new expression was derived as a result of a commutativity rule which is only applied once. This insight is a function of the guidance structure that was provided by the DBI. The Explore_Expression task will terminate. The Memo structure for group 2 at this point is shown in FIG. 15S and the task stack is shown in 15T. The next task that is processed is the Apply Rule task for the Leftshift rule for the Join(2,3) expression in group 4. The Leftshift rule is a transformation rule and as such produces one or more equivalent logical expressions for group 4. In the application of this rule, there are two possible bindings for this rule which are shown in FIG. 15U. Each binding is applied creating two new logical expressions having the form of the substitutes shown in FIG. 15U which are added to the Memo structure. Two new groups are generated as a result of this transformation. Group 5 represents the expression Join(1,3) and group 6 represents the expression Join(0, 3).

After each new expression is generated, the Apply_Rule task generates an Optimize_Expression task to generate one or more plans for the new logical expression. In this example, the Optimize_Expression task selects the Mergejoin rule to apply to the top operator in the expression and subsequent tasks apply the Mergejoin rule to the Join expression in groups 5 and 6. The application of these rules generates two new expressions:

Mergejoin(Mergejoin(filescan $t_2$, filescan $t_3$), filescan $t_1$ ) and

Mergejoin(Mergejoin(filescan $t_1$, filescan $t_3$), filescan $t_2$).

When the Optimize_inputs task is invoked to generate a plan for the Mergejoin(Mergejoin(filescan $t_2$, filescan $t_3$), filescan $t_1$) expression, the plan is never generated. This is due to the excessive cost of the input expression Mergejoin (filescan $t_2$, filescan $t_3$) which exceeds the cost limit set in the context for group 4. The physical expression is not deleted from the Memo structure since the expression may be used in conjunction with another expression at a later stage.

When all the tasks have completed, the Memo structure at this point will contain the expressions shown in FIG. 15W. The optimizer will trace the context pointer in group 4 and find two possible plans associated therewith as shown in FIG. 15W. The context pointer in group 4 will have as its current plan the Mergejoin (Mergejoin(filescan $t_1$, filescan $t_3$, filescan $t_2$) since its cost is less than any of the other candidate plans. The candidate plan pointer will point to the plan Hashjoin (Hashjoin (filescan $t_1$, filescan $t_2$), filescan $t_3$).

Alternate Embodiments

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

The present invention is not limited to a distributed computer system. It may be practiced without the specific details and may be implemented in various configurations, or makes or models of tightly-coupled processors or in various configurations of loosely-coupled microprocessor systems.

It should be noted that although a task stack is the preferred data structure for use in the preferred embodiment, the present invention is not constrained to this type of data structure as others, such as but limited to queues and the like can be utilized.

A principal aspect of the query optimizer presented herein is that it is extensible to suit any type of data model. Thus, the present invention can be applied to optimize queries on object-relational database management systems, object databases, and even data contained in spreadsheets. In essence, the query optimizer presents one interface for dealing with heterogenous data as well as data models.

Additionally, the query optimizer can be applied to optimize problems other than database queries or SQL queries such as but not limited to other types of optimization problems. Furthermore, the rules need not be fixed at compile time. Rules could be added and removed dynamically as a result of executing tasks especially between optimization passes.

Further, the method and system described hereinabove is amenable for execution on various types of executable mediums other than a memory device such as a random access memory. Other types of executable mediums can be used, such as but not limited to, a computer readable storage medium which can be any memory device, compact disc, or floppy disk.

- 55 -

Appendix 1

Pseudocode Representation of the Optimize_Group task

```
        /* For each pass, the Optimize Group task searches for an optimal plan in the
5       specified group having the required physical properties.  If such a plan is not
        available, the task initiates the process of generating such a plan.  */

Optimize_Group(group, required physical properties, guidance)
        {
10      Determine if the group has an optimal plan for the current pass.
        /* An optimal plan is one that meets the required physical properties.  This is
        done by walking the list of contexts for the group and looking for one that has
        the same required physical properties.  Alternatively, a plan that has more
        stringent physical properties than those requested can be used as a suitable
15      plan.  In addition, a plan can exist for the group that does not meet the
        required physical properties.  The cost limit associated with this plan is used
        as the cost limit for the context associated with the plan that will be
        generated. */

20      If the group has an optimal plan, terminate the task.

Create a context for the group with the req'd physical props.

Do for each logical expression in the group
25      {
                push on the task stack the task
                        Optimize_Expression(expression, req'd phys props, guidance)
        }
        The task terminates.
30      }
```

- 56 -

Appendix 2

Pseudocode Representation of the Optimize_Expression task

Optimize_Expression (expression, req'd phys props, guidance)

5 {

Determine an applicable set of rules to use and sort the rules in reverse execution order.

/* The set of applicable rules that is chosen is a function of the DBI. First, one searches to see if a rule is applicable for the current context (i.e. req'd 10 physical properties, guidance, etc.) Then all applicable rules and their associated promising functions are placed in a table and sorted by promising function. A cutoff function determines a cutoff point that is used to narrow the selection of the rules. The remaining rules are then placed onto the task stack in the reverse order as they would execute since the stack is LIFO**/.

15

Set return indicator = Optimize_Expression

Do for each rule j in the set
{

20    Push onto the task stack the task Apply_Rule (rule[j], expression, req'd phys props, return indicator).

/* Determine if the rule requires exploration */
Do for each input i to the rule's pattern that is not a cut or tree operator 25    {
    Push onto the task stack the task Explore_Group(group id[i], pattern of the input[i], req'd phys props, explInputGuidance())
    }
} The task terminates.

30 }

- 57 -

Appendix 3

Pseudocode Representation of the Explore_Group task

Explore_Group (group, pattern, req'd phys props, guidance)

5     {

Determine if this particular pattern has already been explored for this group. /*This is performed by checking the pattern memory for the group. The pattern memory is a bit map where each bit represents a particular pattern.*/

10     If the group has already been explored for the pattern, the task terminates.

Do for each logical expression in the group
{
       Place on the task stack the task Explore_Expression (logical
15     expression, pattern, req'd phys props, guidance)
}
The task terminates.
}

- 58 -

Appendix 4

Pseudocode Representation of the Explore_Expression task

```
   Explore_Expression (expression, pattern, req'd phys props, guidance)
5  {
   Determine a set of transformation rules suitable for this particular logical
   expression, pattern, and guidance.

Set return indicator = Explore_Expression
10
   Do for each rule j of the set
   {
            Push onto the task stack the task Apply_Rule ( rule[j], logical
            expr, req'd phys props, return indicator, guidance).
15
            /* Determine if the rule requires exploration */
            Do for each input i of the rule's pattern that is not a cut or tree operator
            {
            Push onto the task stack the task Explore_Group (group id[i], pattern
20          of the input[i], req'd phys props, guidance)
            }
   }
   Task terminates.
   }
25
```

- 59 -

Appendix 5

Pseudocode Representation of the Apply_Rule task

Apply_Rule (rule, expression, req'd phys props, return indicator, guidance)
5   {
    Derive all bindings for the rule's pattern Do for each binding
    {
10      Loop forever
        /* This loops repeats while the rule fires a new substitute */
        {
            Apply the rule.
            Determine if a substitute was generated.
15          If no substitute was generated then terminate the task.
            Determine if the new expression is in the Memo structure.
        /****Each expression in the Memo structure is assigned a hash value based
        on its contents and its input groups. The values are stored in a hash table.
        When new expressions are created a hash value is determined. If the hash
20      value exists in the hash table then the expression is a duplicate****/
            If the new expression is in the Memo structure
            Then
                terminate task
            Else /* the new expression is not in the Memo structure */
25              Insert the new expression in the Memo structure.
        /****If the new expression is a logical expression then a new logical
        expression is added to the Memo. However, if the new expression is a
        physical expression, a physical expression is added to the Memo.****/

30      / Determine the next task based on the task from hence this task came /
            If return indicator = Explore_Expression
                then

- 60 - push on the task stack the task

Explore_Expression (new expression, rule's pattern, req'd phys props, explGuidance()).

5        If return indicator = Optimize_Expression and new expression is a
logical expression
then
        push on the task stack the task
                Optimize_Expression (new expression, req'd physical
10    props, optGuidance()).
    If return indicator = Optimize_Expression and new expression is a
physical expression
then
        push on the task stack the task
15                Optimize_Inputs ( new expression, req'd physical props,
guidance, input 1).
    }
    }
    The task terminates.
20    }

- 61 -

Appendix 6

Pseudocode Representation of the Optimize_Inputs task

Optimize_Inputs (expression, req'd phys props, guidance, input i)

5 {

If input i = 1

Then

{

Determine the cost for the expression as a function of the operator and
10 the req'd phys props.

If number of inputs for expression > 0 go to next;

Else end:   Update the expression and its associated context

Terminate task

15     }

Else /* input i not = 1 */

{

Check the cost associated with input i-1.

/***** This first entails finding the plan associated with input i. This is done by
20 walking the list of contexts for the group and looking for one that has the
same required physical properties. Alternatively, a plan that has more
stringent physical properties than those requested can be used as a suitable
optimized plan. If the context has more than one plan, take the first one since
this has the lowest cost*****/

25         If the cost for input i-1 is excessive then terminate the task.

/****The cost for input i is compared against the cost for the expression and
the cost limit for the associated context. If the cost limit = NULL then this is
the first context for this plan and no limit has been established as of yet for
this context. ****/

30         Update the cost of the expression to include input i-1's cost

If input i = NULL then go to end /* finished processing all the inputs */ else

- 62 -

```
next:
        Determine the required physical properties for input i
        If input i is the last input
        then
5       {
        push on the task stack
                {
                Optimize_Inputs(expr,req phys props, guidance, NULL) and
                Optimize_Group (group id[i], req'd phys props for input i,
10      optInputGuidance().
                }
        }
        else
        {
15      push on the task stack
                {
                Optimize_Inputs(expr,req phys props, guidance, input i+1) and
                Optimize_Group (group id[i], req'd phys props for input i,
        optInputGuidance().
20              }
        }
        update the cost of the expression to include the cost for this input.
}}}
Terminate task
25 }
```

What is claimed is:

1. A method for generating a plan for executing a database query, comprising:
(a) representing said database query as a query tree including one or more levels of expressions, each expression including zero or more expressions as inputs, each level of expression other than a top level expression having one or more expressions that are input to a higher level expression at a preceding level, the top level expression representing a root expression;
(b) storing in a memory a plurality of implementation and transformation rules, an implementation rule transforming a logical expression into a physical expression, a transformation rule transforming a logical expression into an equivalent logical expression;
(c) partitioning said query tree into one or more levels of subproblems, each subproblem including at least one logical expressions, a top subproblem level having one of said subproblems representing said root expression, each subproblem at each subsequent subproblem level representing one of said inputs to a corresponding higher level expression at a preceding level;
(d) determining an order for analyzing each of said subproblems, said order analyzing said subproblems from a lowest subproblem level to a top subproblem level such that each input is analyzed prior to its corresponding higher level expression;
(e) determining a first plan and a base cost for each subproblem, wherein the first plan comprises only physical expressions; and
(f) using said order, starting at said lowest subproblem level,
(1) generating equivalent physical expressions for least one logical expression in each subproblem by applying at least one transformation rule and at least one implementation rule,
(i) for each equivalent physical expression determine an associated equivalent-expression cost,
(ii) if the equivalent-expression cost is less than the base cost, then denoting the associated equivalent physical expression as a plan and the equivalent-expression cost as the plan cost,
(iii) selecting the plan with the lowest plan cost for use in a next higher subproblem level, and
(2) repeatedly performing said generating step for higher subproblem levels until a plan is selected for said top subproblem level.

2. The method of claim 1 wherein said step (b) of storing stores a promise value for at least a subset of the transformation rules, and
said step (f)(1) of selecting transformation rules to apply, selects and applies transformation rules having a promise value more than a predetermined promise threshold.

3. The method of claim 1 wherein said step (f)(1) of generating equivalent expressions stops after a predetermined number of equivalent expressions are generated.

4. The method of claim 1 wherein said step (f)(1) of generating equivalent expressions further includes the step of selecting transformation rules to apply based on predetermined search heuristics.

5. The method of claim 4 wherein the predetermined search heuristics include promise functions, cutoff functions, guidance functions and match methods.

6. The method of claim 4 said step (f)(1) of generating equivalent expressions generates equivalent expressions based on a guidance function that considers a prior application of said transformation rules.

7. The method of claim 4 wherein said step (e) of determining the base cost for each subproblem and the root expression generates the first plan for each subproblem and the root expression by the following steps:
using said order, starting at said lowest subproblem level,
generating an equivalent base physical expression for each subproblem having a logical expression by applying only implementation rules, each implementation rule having an implementation cost, the implementation rule being designated as the first plan, and the implementation cost is the base plan cost;
repeating said step of generating an equivalent base physical expression for the next higher subproblem level until the first plan is generated for said root level.

8. The method of claim 4 wherein said step of generating an equivalent expression for each subproblem, generates an equivalent expression for each subproblem, such that each subproblem is assigned to a separate task in a task data structure, and a task scheduler manages the execution of the tasks from the task data structure.

9. A method for generating at least one plan for executing a database query, said method comprising the steps of:
(a) providing a task scheduler that manages execution of tasks placed in a task data structure, said task scheduler selecting one or more tasks for execution from said task data structure;
(b) storing in a memory a query tree representing said database query, said query tree containing a plurality of logical expressions, each logical expression including an operator having zero or more inputs, each input being a logical expression, a subset of said expressions representing subtrees having one or more inputs, one such logical expression being a root expression;
(c) storing in a memory a set of rules, a first subset of said rules including zero or more transformation rules, a second subset of said rules including zero or more implementation rules, each of said transformation rules transforming a logical expression into an equivalent expression, each of said implementation rules transforming a logical expression into a physical expression;
(d) storing in a memory a search data structure for storing a plurality of groups, each group including at least one logical expression from said query tree, zero or more equivalent expressions associated therewith and at least one plan, said equivalent expressions including zero or more equivalent logical expressions and zero or more equivalent physical expressions;
(e) placing onto said task data structure an OPTIMIZE_GROUP task for the group associated with said root expression;
(f) when executing an OPTIMIZE_GROUP task for a specific group:
determining if a suitable plan for said specific group exists in said search data structure, and
if no suitable plan exists for said specific group, for each logical expression in said specific group, placing onto said task data structure an OPTIMIZE_EXPRESSION task for each of said logical expressions;
(g) when executing an OPTIMIZE_EXPRESSION task for a specific logical expression:
for at least one rule in the first and second subsets of rules, placing on said task data structure an APPLY_RULE task for said specific logical expression;
(h) when executing an APPLY_RULE task for a p articular expression and a specific rule:

(i) applying said specific rule zero or more times producing zero or more new equivalent expressions, (ii) storing each of said new equivalent expressions in said search data structure, (iii) for each new equivalent physical expression, placing onto said task data structure an OPTIMIZE_INPUTS task for said new equivalent physical expression, and (iv) for each new equivalent logical expression, placing onto said task data structure an OPTIMIZE_EXPRESSION task for s aid new equivalent logical expression; and (i) when executing an OPTIMIZE_INPUTS task for a designated expression, providing a plan for said designated expression once plans for each input to said designated expression are obtained.

10. The method of claim 9, further comprising the step of:
upon completion of said tasks, determining a best plan for said database query from said plans included in said group associated with said root expression.

11. The method of claim 10,
wherein said step (i) obtains said plans for each input to said designated expression by placing onto said task data structure an OPTIMIZE_GROUP task for each of said inputs.

12. The method of claim 9,
wherein said database query has one or more physical properties associated therewith; and
wherein said suitable plan matches at least each physical property associated with said database query.

13. The method of claim 9,
wherein said step (g) selects said rules in accordance with a prescribed criteria.

14. The method of claim 9,
wherein said step (h) further comprises the steps of:
before said step (h)(i), determining all possible bindings, for said rule; and
repeating steps (i)–(iv) for each binding.

15. The method of claim 9,
wherein each of said new equivalent expressions is stored in said search data structure if said new equivalent expression does not already reside in said search data structure.

16. The method of claim 9,
said step (a) including placing on said task data structure an EXPLORE_GROUP task for each input of the rule for which the APPLY_RULE task was placed on said task data structure, excluding inputs that are cut or tree operators;
the method further comprising the steps of:
when executing an EXPLORE_GROUP task for a particular group:
if said group has not been explored previously, for each logical expression associated with said particular group, placing onto said task data structure an EXPLORE_EXPRESSION task for each logical expression associated with said particular group; and
when executing an EXPLORE_EXPRESSION task for a certain logical expression:
determining a second set of rules for application to said certain logical expression,
for each rule of said second set:
placing onto said task data structure an APPLY_RULE task for said certain logical expression with an indicator specifying said EXPLORE_EXPRESSION task, and
if said rule has an input that is a subtree, placing onto said task data structure an EXPLORE_GROUP task for said certain logical expression's group.

17. The method of claim 16,
wherein said step (g)(ii) further comprises the step of placing onto the task data structure an EXPLORE_GROUP task with said specific logical expression's group for each input to said specific rule that is a subtree; and
wherein said step (h) further comprises the step of placing onto the task data structure an EXPLORE_EXPRESSION task with said new equivalent expression when said indicator specifies said EXPLORE_EXPRESSION task.

18. The method of claim 17,
wherein said OPTIMIZE_EXPRESSION task provides said EXPLORE_GROUP task a first guidance structure for use by said EXPLORE_EXPRESSION task in generating said second set of rules;
wherein said APPLY_RULE task provides said EXPLORE_EXPRESSION task a second guidance structure for use by said EXPLORE_EXPRESSION task in generating said second set of rules;
wherein said APPLY_RULE task provides said OPTIMIZE_EXPRESSION task a third guidance structure for use by said OPTIMIZE_EXPRESSION task in generating said first set of rules;
wherein said OPTIMIZE_INPUTS task provides said OPTIMIZE_GROUP task a fourth guidance structure for use by said OPTIMIZE_EXPRESSION task in generating said first set of rules.

19. A database query optimization system, comprising:
a query tree representing a database query, said query tree including one or more levels of expressions, each expression including zero or more expressions as inputs, each level of expression other than a top level expression having one or more expressions that are input to a higher level expression at a preceding level, the top level expression representing a root expression;
a memory for storing a plurality of implementation and transformation rules, each transformation rule transforming a logical expression into an equivalent logical expression, each implementation rule transforming a logical expression into a physical expression;
a search engine for generating one or more plans that execute said database query, said search engine including instructions that
partition said database query into one or more subproblems, each subproblem including at least one logical expression, a top subproblem level having one of said subproblems representing said root expression, each subproblem at each subsequent subproblem level representing one of said inputs to a corresponding higher level expression at a preceding level,
determine an order for analyzing each of said subproblems from a lowest subproblem level to the top subproblem level such that each input is analyzed prior to its corresponding higher level expression,
determine a first plan and a base cost for each subproblem, wherein the first plan comprises only physical expressions;
using said order, starting at said lowest subproblem level,
(1) generate equivalent physical expressions for at least one logical expression in each subproblem by applying at least one transformation rule and at least one implementation rule,
   (i) for each equivalent physical expression determine an associated equivalent-expression cost.
   (ii) if the equivalent-expression cost is less than the base cost, then denote the associated equivalent physical expression as a plan and the equivalent-expression cost as the plan cost,
   (iii) select the plan with the lowest plan cost for use in a next higher subproblem level, and
  (2) repeatedly perform said generating step for higher subproblem levels until a plan is selected for said top subproblem level; and a database implementor for selecting one or more of said transformation rules for application to said logical expressions in each of said subproblems.

20. The system of claim 19 further comprising:

a task data structure for storing a task associated with each subproblem for generating each of said equivalent physical expressions; and a task scheduler that schedules said tasks stored in said task data structure for execution.

21. The system of claim 19, wherein said database implementor further comprises search heuristics for use in selecting those rules that will generate viable plans.

22. The system of claim 19, further comprising promise values associated with each transformation rule, wherein said database implementor selects a transformation rule to apply if the associated promise value is more than a predetermined threshold.

23. The system of claim 19 further comprising, a search data structure for storing expressions generated by said search engine's application of said rules.

24. A computer program product for use in conjunction with a computer system, the computer program product comprising a computer readable storage medium and a computer program mechanism embedded therein, the computer program mechanism comprising:

a query tree representing a database query, said query tree including one or more levels of expressions, each expression including zero or more expressions as inputs, each level of expression other than a top level having one or more expressions that are input to a higher level expression at a preceding level, the top level expression representing a root expression;

a plurality of implementation and transformation rules, each transformation rule transforming a logical expression into an equivalent logical expression, each implementation rule transforming a logical expression into a physical expression;

a search engine for generating one or more plans that execute said database query, said search engine including instructions that partition said database query into one or more subproblems, each subproblem including at least one logical expressions, a top subproblem level having one of said subproblems representing said root expression, each subproblem at each subsequent subproblem level representing one of said inputs to a corresponding higher level expression at a preceding level, determine an order for analyzing each of said subproblems from a lowest subproblem level to top subproblem level such that each input is analyzed prior to its corresponding higher level expression, determine a first plan and a base cost for each subproblem, wherein the first plan comprises only physical expressions;

using said order, starting at said lowest subproblem level,
     (1) generate equivalent physical expressions for at least one logical expression in each subproblem by applying at least one transformation rule and at least one implementation rule,
      (i) for each equivalent physical expression determine an associated equivalent-expression cost,
      (ii) if the equivalent-expression cost is less than the base cost, then denote the associated equivalent physical expression as a plan and the equivalent-expression cost as the plan cost,
      (iii) select the plan with the lowest plan cost for use in a next higher subproblem level, and
     (2) repeatedly perform said generating step for higher subproblem levels until a plan is selected for said top subproblem level; and a database implementor for selecting one or more of said transformation rules for application to said logical expressions in each of said subproblems.

25. The computer program product of claim 24 further comprising:

a task data structure for storing a task associated with each subproblem for generating each of said equivalent physical expressions; and a task scheduler that schedules said tasks stored in said task data structure for execution.

26. The computer program product of claim 24, wherein said database implementor further comprises search heuristics for use in selecting those rules that will generate viable plans.

27. The computer program product of claim 24, further comprising promise values associated with each transformation rule, wherein said database implementor selects a transformation rule to apply if the associated promise value exceeds a predetermined threshold.

28. The medium of claim 24 further comprising, a search data structure for storing expressions generated by said search engine's application of said rules.

* * * * *

UNITED STATES PATENT AND TRADEMARK OFFICE
CERTIFICATE OF CORRECTION

PATENT NO. : 5,822,747
DATED : October 13, 1998
INVENTOR(S) : Goetz Graefe et al.

It is certified that error appears in the above-identified patent and that said Letters Patent is hereby corrected as shown below:

<u>Column 41,</u>
Line 11, delete "s" and insert therefor -- said --
Line 46, delete "(a)" and insert therefor -- (g) --

Signed and Sealed this

Third Day of May, 2005

JON W. DUDAS
*Director of the United States Patent and Trademark Office*